United States Patent
Wu

(10) Patent No.: US 9,110,304 B2
(45) Date of Patent: Aug. 18, 2015

(54) TWO-DIMENSIONAL AND THREE-DIMENSIONAL SWITCHABLE LIQUID CRYSTAL DISPLAY DEVICE AND DISPLAYING METHOD THEREOF

(71) Applicant: AU Optronics Corporation, Hsinchu (TW)

(72) Inventor: Po-Jung Wu, Hsinchu (TW)

(73) Assignee: AU OPTRONICS CORPORATION, Hsinchu (TW)

(*) Notice: Subject to any disclaimer, the term of this patent is extended or adjusted under 35 U.S.C. 154(b) by 304 days.

(21) Appl. No.: 13/658,208

(22) Filed: Oct. 23, 2012

(65) Prior Publication Data

US 2014/0111712 A1 Apr. 24, 2014

(51) Int. Cl.
| | |
|---|---|
| G09G 1/06 | (2006.01) |
| G09G 3/18 | (2006.01) |
| H04N 13/00 | (2006.01) |
| G02B 27/26 | (2006.01) |
| H04N 13/04 | (2006.01) |
| G02F 1/1347 | (2006.01) |

(52) U.S. Cl.
CPC ............ *G02B 27/26* (2013.01); *G02F 1/13471* (2013.01); *H04N 13/0409* (2013.01); *H04N 13/0452* (2013.01); *H04N 2213/001* (2013.01)

(58) Field of Classification Search
CPC ............ G09G 1/06; G09G 2320/0209; G09G 2310/0254; G09G 3/18; H04N 13/00; H04N 3/127
USPC .................................. 345/204–215, 690–699
See application file for complete search history.

(56) References Cited

U.S. PATENT DOCUMENTS

| | | | |
|---|---|---|---|
| 4,443,065 A | 4/1984 | Funada et al. | |
| 5,315,377 A | 5/1994 | Isono et al. | |
| 6,046,786 A * | 4/2000 | Sharp et al. | 349/119 |
| 8,743,188 B2 * | 6/2014 | Kim | 348/58 |
| 2002/0171793 A1 * | 11/2002 | Sharp et al. | 349/117 |
| 2006/0291053 A1 * | 12/2006 | Robinson et al. | 359/465 |
| 2007/0008406 A1 * | 1/2007 | Shestak et al. | 348/58 |

(Continued)

FOREIGN PATENT DOCUMENTS

| | | |
|---|---|---|
| CN | 201097041 Y | 8/2008 |
| JP | 09015548 | 1/1997 |

(Continued)

*Primary Examiner* — Kent Chang
*Assistant Examiner* — William Lu
(74) *Attorney, Agent, or Firm* — Locke Lord LLP; Tim Tingkang Xia, Esq.

(57) ABSTRACT

An LCD device operably switchable between 2D and 3D display modes includes an active retardation panel having a plurality of retardation pixels arranged in at least M*N retardation pixel matrix with a first liquid crystal (LC) layer, and an LCD panel positioned having a plurality of display pixels arranged in at least M*N display pixel matrix with a second LC layer. Each retardation pixel has a first retardation A(i, j), and each display pixel has a second retardation B(i, j). The active retardation panel and LCD panel are arranged such that the retardation pixel matrix is positioned corresponding to the display pixel matrix, and an image displayed from each display pixel and passed through corresponding retardation pixel is simultaneously viewable by left and right eyes of a viewer and satisfies with:

$$L(i,j)=f[A(i+1,j)+B(i,j)], \text{ and } R(i,j)=f[A(i,j)+B(i,j)].$$

$L(i, j)$ and $R(i, j)$ are respectively left-eye and right-eye viewed gray levels of the image.

29 Claims, 16 Drawing Sheets

(56) References Cited

U.S. PATENT DOCUMENTS

| | | |
|---|---|---|
| 2007/0171193 A1 | 7/2007 | Nakamura |
| 2009/0122402 A1* | 5/2009 | Shemo et al. ............ 359/489 |
| 2009/0310044 A1* | 12/2009 | Lee ............ 349/15 |
| 2010/0007716 A1* | 1/2010 | Lee et al. ............ 348/43 |
| 2010/0177113 A1* | 7/2010 | Gay et al. ............ 345/589 |
| 2011/0157171 A1* | 6/2011 | Lin ............ 345/419 |
| 2011/0228181 A1* | 9/2011 | Jeong et al. ............ 349/15 |
| 2011/0255019 A1* | 10/2011 | Son ............ 349/15 |
| 2012/0147138 A1* | 6/2012 | Yu ............ 348/43 |
| 2012/0313930 A1* | 12/2012 | Yun et al. ............ 345/419 |
| 2012/0320173 A1* | 12/2012 | Kim et al. ............ 348/60 |
| 2013/0033747 A1* | 2/2013 | Huang et al. ............ 359/462 |
| 2013/0044147 A1* | 2/2013 | Kim et al. ............ 345/697 |
| 2013/0050193 A1* | 2/2013 | Ko ............ 345/419 |
| 2013/0069918 A1* | 3/2013 | Hou et al. ............ 345/204 |

FOREIGN PATENT DOCUMENTS

| | | |
|---|---|---|
| JP | 2008262157 | 10/2008 |
| JP | 2011197640 A | 10/2011 |

* cited by examiner

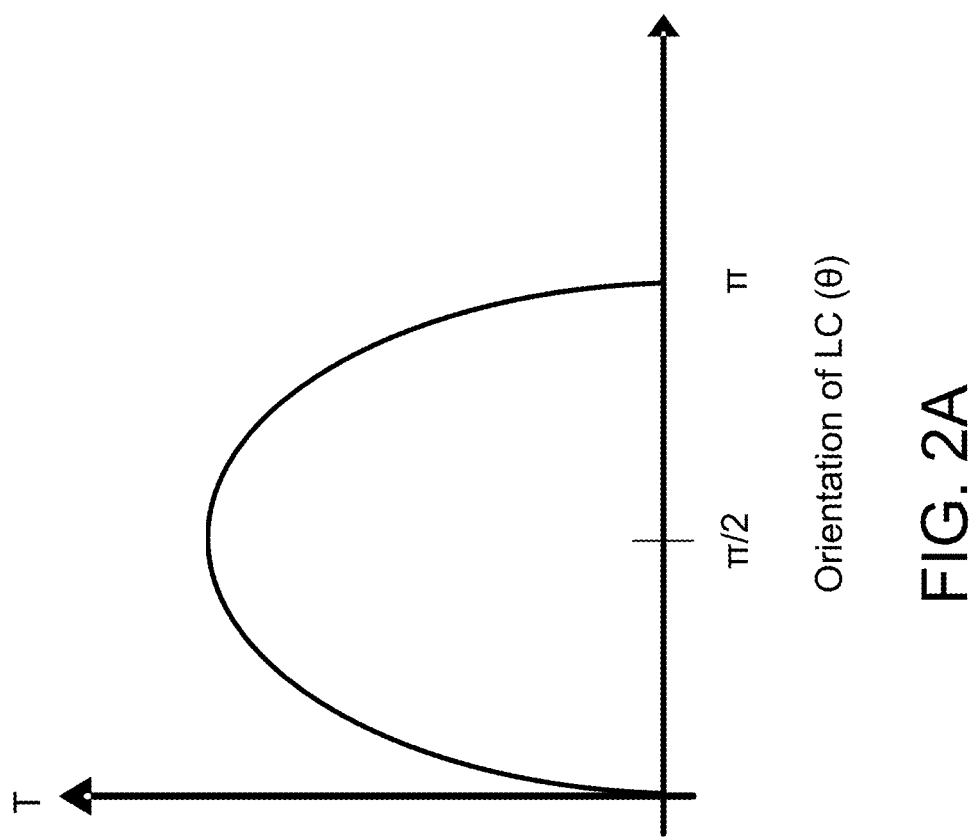

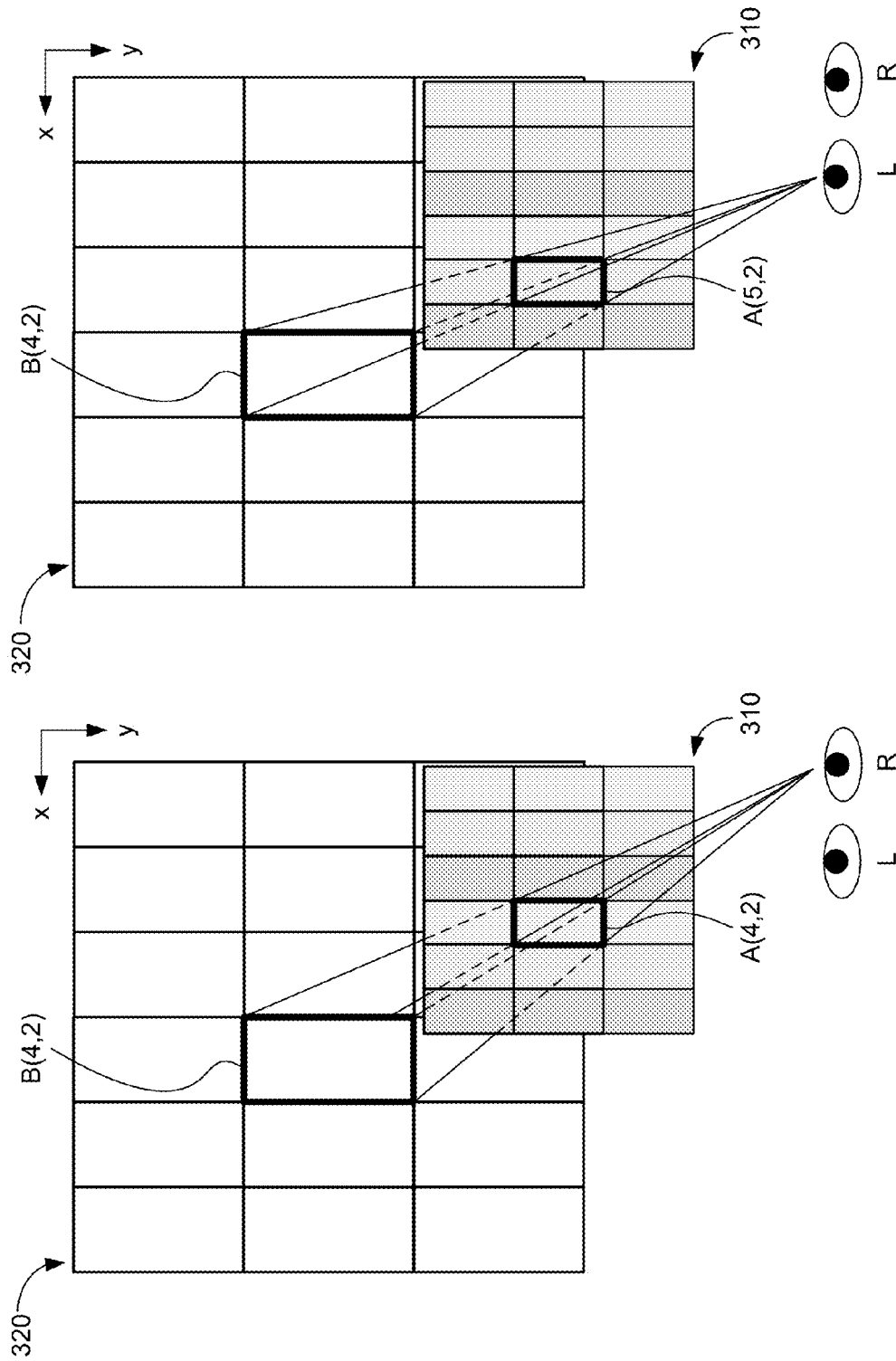

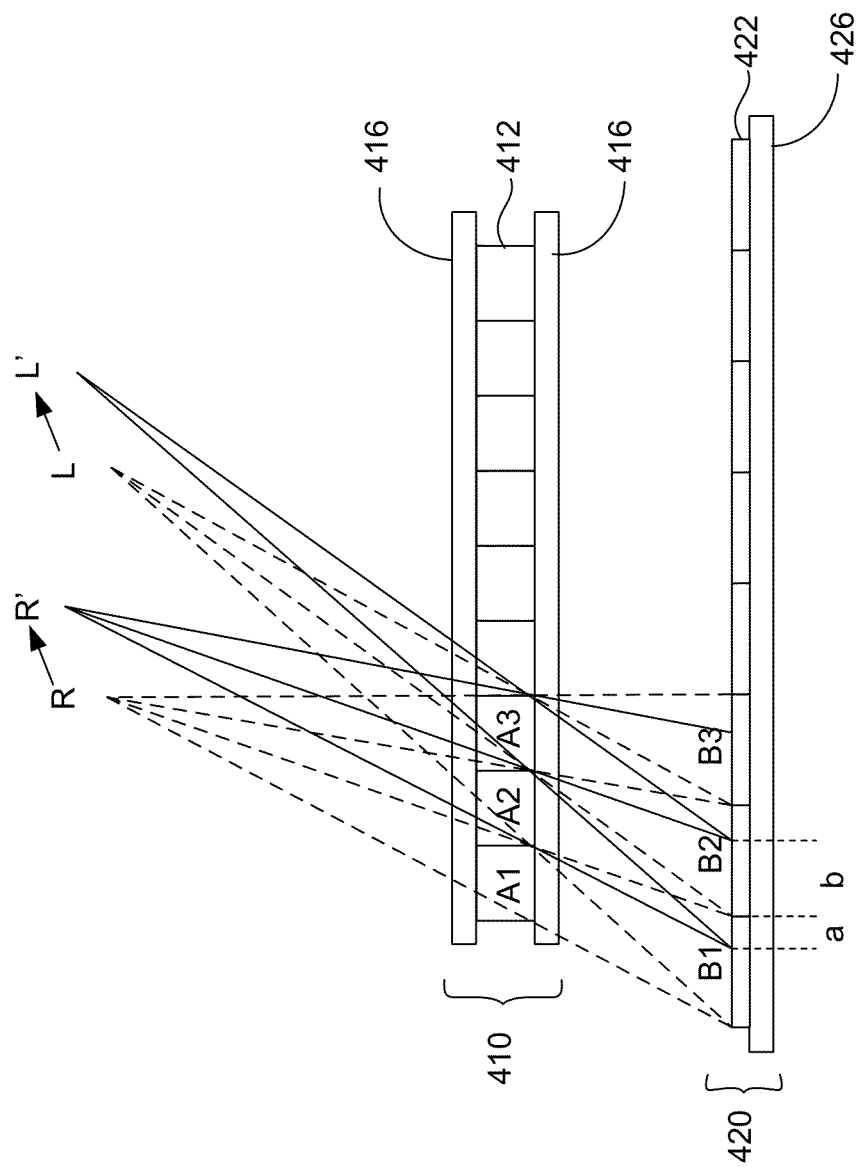

TWO-DIMENSIONAL AND THREE-DIMENSIONAL SWITCHABLE LIQUID CRYSTAL DISPLAY DEVICE AND DISPLAYING METHOD THEREOF

FIELD OF THE INVENTION

The disclosure generally relates to liquid crystal display (LCD) technology, and more particularly to an LCD device operably switchable between a two-dimensional (2D) display mode and a three-dimensional (3D) display mode and methods of displaying images with the same.

BACKGROUND OF THE INVENTION

With the developments and wide applications of electronic products, there has been increasing demand for flat panel displays that consume less electric power and occupy less space. Among flat panel displays, liquid crystal displays (LCDs) are characterized by thin appearance, low power consumption, and low radiation, and have been widely applied in various electronic products such as computer monitors, mobile phones, personal digital assistants (PDAs), or flat panel televisions.

A typical LCD includes a display panel and a backlight. The display panel generally includes an active liquid crystal layer, two substrate, and two polarizers. If the display panel is used for displaying color images, a color filter is also required. The display panel has an active area, in which a plurality of pixels is arranged in a matrix. For example, an active area with an M*N pixel matrix has M pixel rows and N pixel columns, where M and N are integers greater than one. The backlight emits light, and light passes through each pixel of the display panel, including the first polarizer, the active liquid crystal layer of the pixel, and the second polarizer, toward the eyes of the viewer. For each pixel, the orientation of liquid crystal molecules of the active liquid crystal layer may be individually controlled to provide retardation of the light such that intensity of the light passing through each pixel may be reduced. Accordingly, from the eyes of the viewer, the light signals from the display panel create an image displayed, with light passing through each pixel showing different intensity, i.e. each pixel showing different gray level value.

In order to view 3D images, a viewer needs to receive different signals of the 3D images with the left eye and right eye. In other words, for displaying 3D images, the LCD needs to provide different left and right signals for the left eye and right eye of the viewer. Generally, this is achievable by providing a barrier layer on the active area of the LCDs.

FIG. 6 shows a typical 3D LCD structure, in which the LCD 600 includes a barrier layer 610 and a display panel 620, and has an optimum viewable zone 650 for the viewer to see the 3D images effectively displayed with both eyes. The barrier layer 610 includes a plurality of barrier units B1, B2, B3, . . . and the display panel 620 includes a plurality of pixels P1, P2, P3, . . . , and the size of the barrier units and the pixels may be determined accordingly such that the viewer in the optimum viewable zone 650 may see the pixels through different barrier units with different eyes. For example, as shown in FIG. 6, the right eye R of the viewer in the optimum viewable zone 650 may receive light passing through the pixels P1, P2, P3, etc. and through the barrier units with same numbers as the pixels P1-B1, P2-B2, P3-B3, etc., and the left eye L of the viewer in the optimum viewable zone 650 may receive light passing through the pixels P1, P2, P3, etc. and through the barrier units having the next number to the pixels P1-B2, P2-B3, P3-B4, . . . Pn-Bn+1, etc. Thus, the barrier units of the barrier layer 610 may be alternatively opaque and transparent such that the barrier units with odd numbers B1, B3, . . . are opaque and the barrier units with even numbers B2, B4, . . . are transparent. Thus, both eyes may receive light passing through the transparent barrier units B2, B4, . . . , and light emitting toward the opaque barrier units B1, B3, . . . are blocked by these opaque barrier units. In other words, for each image frame, the left eye receives only the image signals corresponding to the pixels with odd numbers P1, P3, . . . , and the right eye receives only the image signals corresponding to the pixels with even numbers P2, P4, . . . from the display panel 620.

However, for the LCD with the barrier layer 610 to perform 3D display capacity as shown in FIG. 6, two major problems exists in reduced image resolution and reduced luminance. As disclosed above, when the LCD displays an image, each eye of the viewer sees only the image signals corresponding to half of the pixels (either the odd number half or the even number half). Thus, with the requirement of high resolution of the LCDs, the LCDs with 3D display capacity requires twice the number of pixels to display an image in the same resolution as typical LCDs without the 3D display capacity, increasing the size of the LCD and the manufacturing cost. Further, part of the light emitted by the backlight of the LCD is blocked by the opaque barrier units B1, B3, . . . of the barrier layer 610, resulting in the reduced luminance of the LCD and waste of energy.

To solve the deficiency of reduced resolution, an alternative design of the LCD utilizes a modified barrier layer 610 with a similar structure. Generally, the consecutive images displayed by the LCDs or other display devices are defined as "frames", and each LCD has a certain frame rate, which refers to the frequency or the rate at which the LCD produces image frames. Typically, the human eye and its brain interface, the human visual system, can process 10 to 12 separate images per second, perceiving them individually. The LCDs and other displays have frame rates higher than the 10-12 Hz of the human visual system. Thus, the transparency of the barrier units of the barrier layer 610 may be controllable such that all the barrier units are alternatively opaque and transparent. For example, in one frame, the barrier units with odd numbers B1, B3, . . . are opaque and the barrier units with even numbers B2, B4, . . . are transparent. In the next frame, the barrier units with odd numbers B1, B3, . . . are transparent and the barrier units with even numbers B2, B4, . . . are opaque. Thus, each eye of the viewer may alternatively receive the image signals corresponding to the pixels with odd numbers P1, P3, . . . and the image signals corresponding to the pixels with even numbers P2, P4, . . . in two consecutive frames. Thus, the viewer may see the images with full resolution of the LCDs.

However, the LCDs with the controllable barrier layer 610 do not solve the deficiency of reduced luminance. Further, the enhanced resolution in such LCDs with the controllable barrier layer 610 leads to reduced frame rate. As discussed above, the LCD requires two consecutive frames to display one image frame. Thus, for a LCD with 60 Hz frame rate, the actual frame rate in displaying 3D images becomes 30 Hz. In other words, to maintain the 60 Hz frame rate for displaying the 3D images, the LCD frame rate needs to be increased to 120 Hz, which increases the manufacturing costs of the LCDs.

Therefore, a heretofore unaddressed need exists in the art to address the aforementioned deficiencies and inadequacies.

SUMMARY OF THE INVENTION

The present invention, in one aspect, relates to a liquid crystal display (LCD) device operably switchable between a two-dimensional (2D) display mode and a three-dimensional (3D) display mode. In one embodiment, the LCD includes: a first polarizer and a second polarizer spaced apart to each other; an active retardation panel disposed between the first polarizer and the second polarizer, the active retardation panel having a plurality of retardation pixels arranged in a retardation pixel matrix having at least M pixel columns and at least N pixel rows, each of the retardation pixel having a first retardation A(i, j), wherein M and N are positive integers, i is a positive integer between 1 and M, and j is a positive integer between 1 and N; and a liquid crystal display panel disposed between the active retardation panel and the second polarizer, the liquid crystal display panel having a plurality of display pixels arranged in a display pixel matrix having at least M pixel columns and at least N pixel rows, each of the display pixel having a second retardation B(i, j), the retardation pixel matrix being positioned corresponding to the display pixel matrix. An image displayed from each of the display pixels of the liquid crystal display panel and passed through the active retardation panel is simultaneously viewed by the left eye and the right eye of the viewer and satisfies the relationship of:

$$L(i,j)=f[A(i+1,j)+B(i,j)], \text{ and}$$

$$R(i,j)=f[A(i,j)+B(i,j)],$$

where L(i, j) and R(i, j) are respectively left-eye and right-eye viewed gray levels of the image.

In one embodiment, no polarizer is disposed between the liquid crystal display panel and the active retardation panel.

In one embodiment, the liquid crystal display device further includes a color filter disposed in one of the liquid crystal display panel and the active retardation panel.

In one embodiment, the liquid crystal display panel and the active retardation panel are spatially separated by a gap. In a further embodiment, the gap is filled with a transparent material.

In one embodiment, the liquid crystal display panel and the active retardation panel are integratedly formed.

In one embodiment, the active retardation panel includes a first liquid crystal layer, and the liquid crystal display panel includes a second liquid crystal layer. In a further embodiment, for each retardation pixel of the active retardation panel, the first retardation A(i, j) varies with orientation of LC molecules in the first liquid crystal layer of the retardation pixel which is controlled by a first electrical field applied to the retardation pixel of the active retardation panel, and wherein for each display pixel of the liquid crystal display panel, the second retardation B(i, j) varies with orientation of LC molecules in the second liquid crystal layer of the display pixel which is controlled by a second electrical field applied to the display pixel of the liquid crystal display panel.

The LCD device may operate in the 2D display mode when L(i, j)=R(i, j), and for the plurality of the retardation pixels, the first retardations A(i, j) are the same. In one embodiment, the LCD device operates in the 2D display mode when the plurality of retardation pixels of the active retardation panel is driven by the same first electrical field such that for the plurality of the retardation pixels, the first retardations A(i, j) are the same. In another embodiment, the LCD operates in the 2D display mode when the plurality of retardation pixels of the active retardation panel is not driven by the first electrical field.

In another embodiment, the LCD may operate in the 3D display mode when L(i, j)≠R(i, j). In one embodiment, the LCD operates in the 3D display mode when the plurality of retardation pixels of the active retardation panel is driven by the first electrical field, and the plurality of display pixels of the liquid crystal display panel is driven by the second electrical field. In another embodiment, each display pixel of the liquid crystal display panel projects to at least one of the retardation pixel of the active retardation panel, and each of the at least one retardation pixel of the active retardation panel has at least one compensation ration such that the image displayed in each display pixel of the liquid crystal display panel is compensated by the at least one retardation pixel with the at least one compensation ratio.

In one embodiment, the liquid crystal display device further includes compensation ratios a and b, such that $$L(i,j)=a\times f[A(i+1,j)+B(i-1,j)]+b\times f[A(i+1,j)+B(i,j)], \text{ and}$$

$$R(i,j)=a\times f[A(i,j)+B(i-1,j)]+b\times f[A(i,j)+B(i,j)],$$

wherein 0≤a≤1, 0≤b≤1, and at least one of a and b is not equal to 0.

In another embodiment, the liquid crystal display device further includes compensation ratios a(i,j), b(i,j), c(i,j), d(i,j), e(i,j), f(i,j), g(i,j), h(i,j), such that $$R(i, j) = \\ a(i, j) \times f[A(i, j) + B(i-1, j-1)] + b(i, j) \times f[A(i, j) + B(i, j-1)] + \\ c(i, j) \times f[A(i, j) + B(i-1, j)] + d(i, j) \times f[A(i, j) + B(i, j)],$$

and $$L(i, j) = \\ e(i, j) \times f[A(i, j) + B(i-2, j-1)] + f(i, j) \times f[A(i, j) + B(i-1, j-1)] + \\ g(i, j) \times f[A(i, j) + B(i-2, j)] + h(i, j) \times f[A(i, j) + B(i-1, j)],$$

wherein 0≤a(i,j)≤1, 0≤b(i,j)≤1, 0≤c(i,j)≤1, 0≤d(i,j)≤1, and 0≤e(i,j)≤1, 0≤f(i,j)≤1, 0≤g(i,j)≤1, 0≤h(i,j)≤1, and at least one of a(i, j), b(i, j), c(i, j), d(i, j), e(i, j), f(i, j), g(i, j) and h(i, j) is not equal to 0.

In yet another embodiment, the liquid crystal display device further includes compensation ratios a(i,j), b(i,j), c(i, j), d(i,j), e(i,j), f(i,j), g(i,j), h(i,j), such that $$R(i, j) = \\ a(i, j) \times f[A(i, j-1) + B(i, j)] + b(i, j) \times f[A(i+1, j-1) + B(i, j)] + \\ c(i, j) \times f[A(i, j) + B(i, j)] + d(i, j) \times f[A(i+1, j) + B(i, j)],$$

and $$L(i, j) = \\ e(i, j) \times f[A(i+1, j-1) + B(i, j)] + f(i, j) \times f[A(i+2, j-1) + B(i, j)] + \\ g(i, j) \times f[A(i+1, j) + B(i, j)] + h(i, j) \times f[A(i+2, j) + B(i, j)],$$

wherein 0≤a(i,j)≤1, 0≤b(i,j)≤1, 0≤c(i,j)≤1, 0≤d(i,j)≤1, and 0≤e(i,j)≤1, 0≤f(i,j)≤1, 0≤g(i,j)≤1, 0≤h(i,j)≤1, and at least one of a(i, j), b(i, j), c(i, j), d(i, j), e(i, j), f(i, j), g(i, j) and h(i, j) is not equal to 0.

In another aspect, the present invention discloses a method of displaying an image, which includes: (a) providing a liquid crystal display (LCD) device comprising: an active retardation panel having a first liquid crystal (LC) layer defining a plurality of retardation pixels arranged in a retardation pixel matrix having M pixel columns and N pixel rows, wherein each retardation pixel has a first retardation A(i, j), wherein M and N are positive integers, i is a positive integer between 1 and M, and j is a positive integer between 1 and N; and a liquid crystal display panel positioned behind the active retardation panel, having a second LC layer defining a plurality of display pixels arranged in a display pixel matrix having M pixel columns and N pixel rows, wherein each display pixel has a second retardation B(i, j), wherein the active retardation panel and the liquid crystal display panel are arranged such that the retardation pixel matrix is positioned corresponding to the display pixel matrix; (b) generating left-eye and right-eye viewed gray levels L(i, j) and R(i, j) respectively for the image to be displayed; (c) calculating, for each retardation pixel of the active retardation panel and for each display pixel of the liquid crystal display panel, the first retardation A(i, j) and the second retardation B(i, j) by:

$$L(i,j)=f[A(i+1,j)+B(i,j)], \text{ and}$$

$$R(i,j)=f[A(i,j)+B(i,j)], \text{ and}$$

(d) displaying the image with the first retardation A(i, j) for each retardation pixel of the active retardation panel and the second retardation B(i, j) for each display pixel of the liquid crystal display panel such that the image displayed in each retardation pixel of the active retardation pixel of the active retardation panel, or in each display pixel of the liquid crystal display panel, is simultaneously viewable by left and right eyes of a viewer in front of the active retardation panel.

In one embodiment, the image to be displayed is a 2D image, wherein L(i, j)=R(i, j), and wherein for the plurality of the retardation pixels, the first retardations A(i, j) are the same. In a further embodiment, the displaying the image by the liquid crystal display device includes: controlling, for each display pixel of the liquid crystal display panel, orientation of LC molecules of the display pixel to have the second retardation B(i, j) by applying a second electrical field to the display pixel. In another embodiment, the displaying the image by the liquid crystal display device includes: controlling, for each retardation pixels of the active retardation panel, orientation of LC molecules of the retardation pixel such that the plurality of the retardation pixels has the same first retardation A(i, j) by applying the same first electrical field to each retardation pixel; and controlling, for each display pixel of the liquid crystal display panel, orientation of LC molecules of the display pixel to have the second retardation B(i, j) by applying a second electrical field to the display pixel.

In one embodiment, the image to be displayed is a 3D image, and wherein L(i, j)≠R(i, j). In a further embodiment, the displaying the image by the liquid crystal display device includes: controlling, for each retardation pixel of the active retardation panel, orientation of LC molecules of the retardation pixel to have the first retardation A(i, j) by applying a first electrical field to the retardation pixel; and controlling, for each display pixel of the liquid crystal display panel, orientation of LC molecules of the display pixel to have the second retardation B(i, j) by applying a second electrical field to the display pixel.

In one embodiment, the displaying the image by the liquid crystal display device includes: projecting each retardation pixel of the active retardation panel to at least one of the display pixels of the liquid crystal display panel; and generating, for each of the at least one display pixel of the liquid crystal display panel, at least one compensation ratio such that the image displayed in each retardation pixel of the active retardation panel is compensated by the at least one display pixel with the at least one compensation ratio. In another embodiment, the displaying the image by the liquid crystal display device includes: projecting each display pixel of the liquid crystal display panel to at least one of the retardation pixels of the active retardation panel; and generating, for each of the at least one retardation pixel of the active retardation panel, at least one compensation ratio such that the image displayed in each display pixel of the liquid crystal display panel is compensated by the at least one retardation pixel with the at least one compensation ratio.

In yet another aspect, the invention relates to a method of displaying an image. The method in one embodiment includes providing a liquid crystal display (LCD) device. The LCD has an active retardation panel having a first liquid crystal (LC) layer defining a plurality of retardation pixels arranged in a retardation pixel matrix having M pixel columns and N pixel rows, wherein each retardation pixel has a first retardation A(i, j), wherein M and N are positive integers, i is a positive integer between 1 and M, and j is a positive integer between 1 and N; and a liquid crystal display panel positioned behind the active retardation panel, having a second LC layer defining a plurality of display pixels arranged in a display pixel matrix having M pixel columns and N pixel rows, wherein each display pixel has a second retardation B(i, j), wherein the active retardation panel and the liquid crystal display panel are arranged such that the retardation pixel matrix is positioned corresponding to the display pixel matrix.

The method also includes driving the active retardation panel and the liquid crystal display panel, respectively, to display the image on one of the active retardation panel and the liquid crystal display panel, such that the image displayed in each retardation pixel of the active retardation panel, or in each display pixel of the liquid crystal display panel is simultaneously viewable by left and right eyes of a viewer in front of the active retardation panel and satisfies the relationship of:

$$L(i,j)=f[A(i+1,j)+B(i,j)], \text{ and}$$

$$R(i,j)=f[A(i,j)+B(i,j)],$$

where L(i, j) and R(i, j) are respectively left-eye and right-eye viewed gray levels of the image displayed in each retardation pixel of the active retardation panel, or in each display pixel of the liquid crystal display panel.

Another aspect of the present invention discloses a liquid crystal display (LCD) device operably switchable between a two-dimensional (2D) display mode and a three-dimensional (3D) display mode for a viewer having a left eye and a right eye, including: a first polarizer and a second polarizer spaced apart to each other; a first panel disposed between the first polarizer and the second polarizer, the first panel having a plurality of first pixels arranged in a first pixel matrix having at least M pixel columns and at least N pixel rows, each of the first pixel having a first retardation A(i, j), wherein M and N are positive integers, i is a positive integer between 1 and M, and j is a positive integer between 1 and N; and a second panel disposed between the first panel and the second polarizer, the second panel having a plurality of second pixels arranged in a second pixel matrix having at least M pixel columns and at least N pixel rows, each of the second pixel having a second retardation B(i, j), the first pixel matrix being positioned corresponding to the second pixel matrix. An image displayed from each of the second pixels of the second panel and passed through the first panel is simultaneously viewed by the left eye and the right eye of the viewer and satisfies the relationship of:

$$L(i,j)=f[A(i+1,j)+B(i,j)], \text{ and}$$

$$R(i,j)=f[A(i,j)+B(i,j)],$$

where L(i, j) and R(i, j) are respectively left-eye and right-eye viewed gray levels of the image.

In one embodiment, the first panel includes an active retardation panel and the second panel includes a liquid crystal display panel.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein:

FIG. 2A shows a chart of the retardation of a pixel of the LC layer according to one embodiment of the present invention;

FIG. 3B shows schematically projection of the first and second pixels from the right eye of the viewer the LCD operating in the 3D display mode according to one embodiment of the present invention;

FIG. 3C shows schematically projection of the first and second pixels from the left eye of the viewer the LCD operating in the 3D display mode according to one embodiment of the present invention;

FIG. 4A shows schematically a top view of the LCD operating in the 3D display mode according to one embodiment of the present invention;

DETAILED DESCRIPTION OF THE INVENTION

Figure 1A:
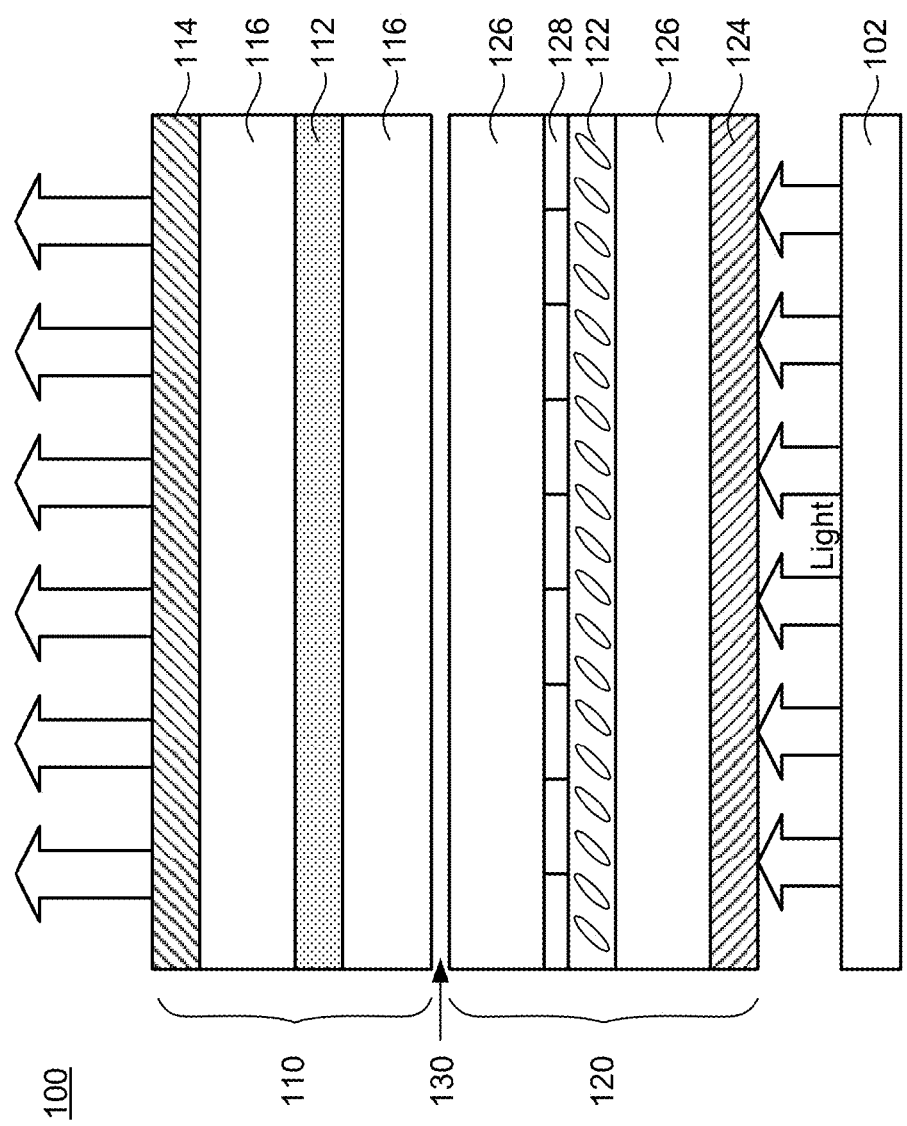
FIG. 1A shows schematically an LCD according to one embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, terms described in singular forms with "a", "an" and "the" are intended to include embodiments of the terms in either singular or plural forms, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

The description will be made as to the embodiments of the present invention in conjunction with the accompanying drawings in FIGS. 1-6. In accordance with the purposes of this invention, as embodied and broadly described herein, this invention, in one aspect, relates to an LCD device operably switchable between a 2D display mode and a 3D display mode and methods of displaying a 3D image with the same.

Figure 1B:
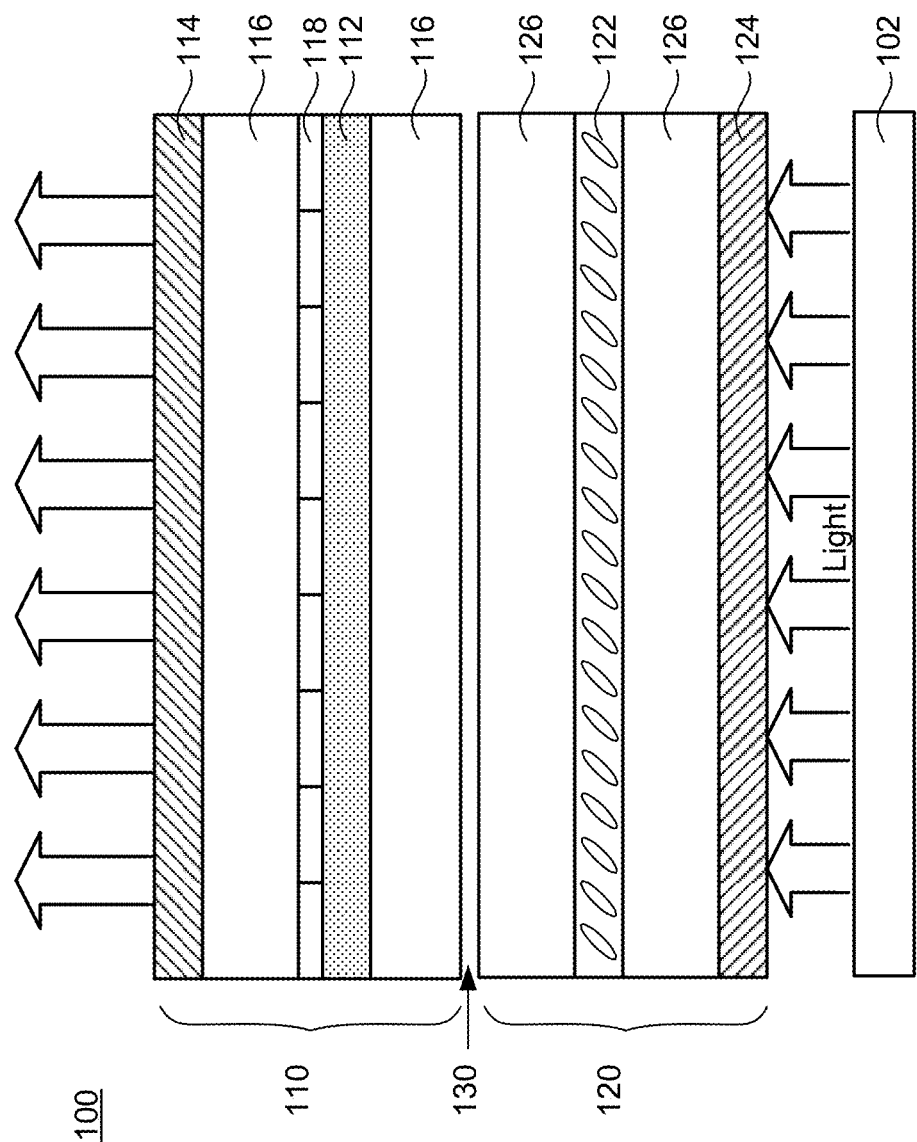
FIG. 1B shows schematically an LCD according to another embodiment of the present invention.

FIG. 1A shows schematically an LCD according to one embodiment of the present invention, and FIG. 1B shows schematically an LCD according to another embodiment of the present invention. It should be appreciated that the size and shape of the panels and the layers of the panels are merely provided for illustrating the structures of the LCD, and are not intended to limit the actual size and shape of the panels and the layers thereof.

As shown in FIGS. 1A and 1B, the LCD device 100 includes a first panel 110, such as an active retardation panel, which is on a viewer side or a viewing apparatus side, and a second panel 120, such as a liquid crystal display panel, which is on the light source side. The LCD device 100 further includes a first polarizer 114 and a second polarizer 124 spaced apart to each other. The first panel 110 is disposed between the first polarizer 114 and the second polarizer 124, and includes a first LC layer 112 and two substrates 116. The second panel 120 is disposed between the first panel 110 and the second polarizer 124, and includes a second LC layer 122 and two substrates 126. Further, as shown in both FIGS. 1A and 1B, the LCD 100 may include a color filter for color displaying, which is provided in one of the first panel 110 and the second panel 120. As shown in FIG. 1A, in one embodiment, the second panel 120 includes the color filter 128. As shown in FIG. 1B, in another embodiment, the first panel 110 includes the color filter 118. In other words, the LCDs 100 as shown in FIGS. 1A and 1B may have essentially the same layer structures except for the position of the color filter.

The first LC layer 112 is disposed between the two substrates 116, and the second LC layer 122 is disposed between the two substrates 126. Each of the first and second LC layers 112 and 122 include LC molecules, and the orientation of the LC molecules may be controlled by applying electrical fields to control the optical transmittance of the first and second LC layers 112 and 122. In some embodiments, the substrates 116 and 126 may be glass substrates or other transparent substrates, and the substrates 116 and 126 may be made of the same material or different materials.

The first polarizer 114 and the second polarizer 124 are arranged such that the first LC layer 112 and the second LC layer 122 are positioned between the first polarizer 114 and the second polarizer 124. In other words, the first polarizer 114 is disposed on the surface facing the viewer or the viewing apparatus (on the top of FIG. 1A), and the second polarizer 124 is disposed on the surface facing the light source, such as a backlight 102 (on the bottom of FIG. 1A) such that all other layers of the first and second panels 110 and 120 are clamped between the first and second polarizers 114 and 124. It is preferred that no additional polarizer is disposed between the first panel 110 and the second panel 120.

The color filter is provided for displaying the images in color. As shown in FIG. 1A, the color filter 128 is disposed on one side of the second LC layer 122 between the two substrates 126. Similarly, as shown in FIG. 1B, the color filter 118 is disposed on one side of the first LC layer 112 between the two substrates 116. In some embodiments, the color filter may be a typical RGB color filter with a plurality of patterned color filter layers, showing the red (R), green (G) and blue (B) colors.

In one embodiment, the first panel 110 and the second panel 120 are spatially separated by a gap 130. The gap 130 may be an air gap, or may be filled with a transparent material. In some embodiments, the transparent material may be glue or adhesive to adhere the first panel 110 and the second panel 120 together. In some embodiments, the transparent material may be glass or other transparent materials, and may be the same material as the substrates 116 and 126. Thus, the substrates 116 and 126 on the two sides of the gap 130 are made of the same transparent material, and the gap 130 is filled with the same material. The first and second panels 110 and 120 may be integrated formed. In other words, there may be no actual gap between the first and second panels 110 and 120, and one transparent substrate may be utilized to essentially replace the substrates 116 and 126 on the two sides of the gap 130.

Typically, the LC layer of a LCD panel defines a plurality of pixels such that each pixel can be individually controlled such that orientation of the LC molecules in the pixel may be changed for polarization and compensation of the light passing the pixel. The polarization and compensation of light by the pixels of the LC layer is generally referred to as optical retardation, or simply retardation. In other words, light passing a pixel is retarded by the pixel based on the controlled orientation of the LC molecules of the pixel. For each pixel, retardation generally relates to the optical transmittance of the pixel, and when light passes the pixel, the optical transmittance of the pixel determines the image signal displayed by the pixel.

Figure 1C:
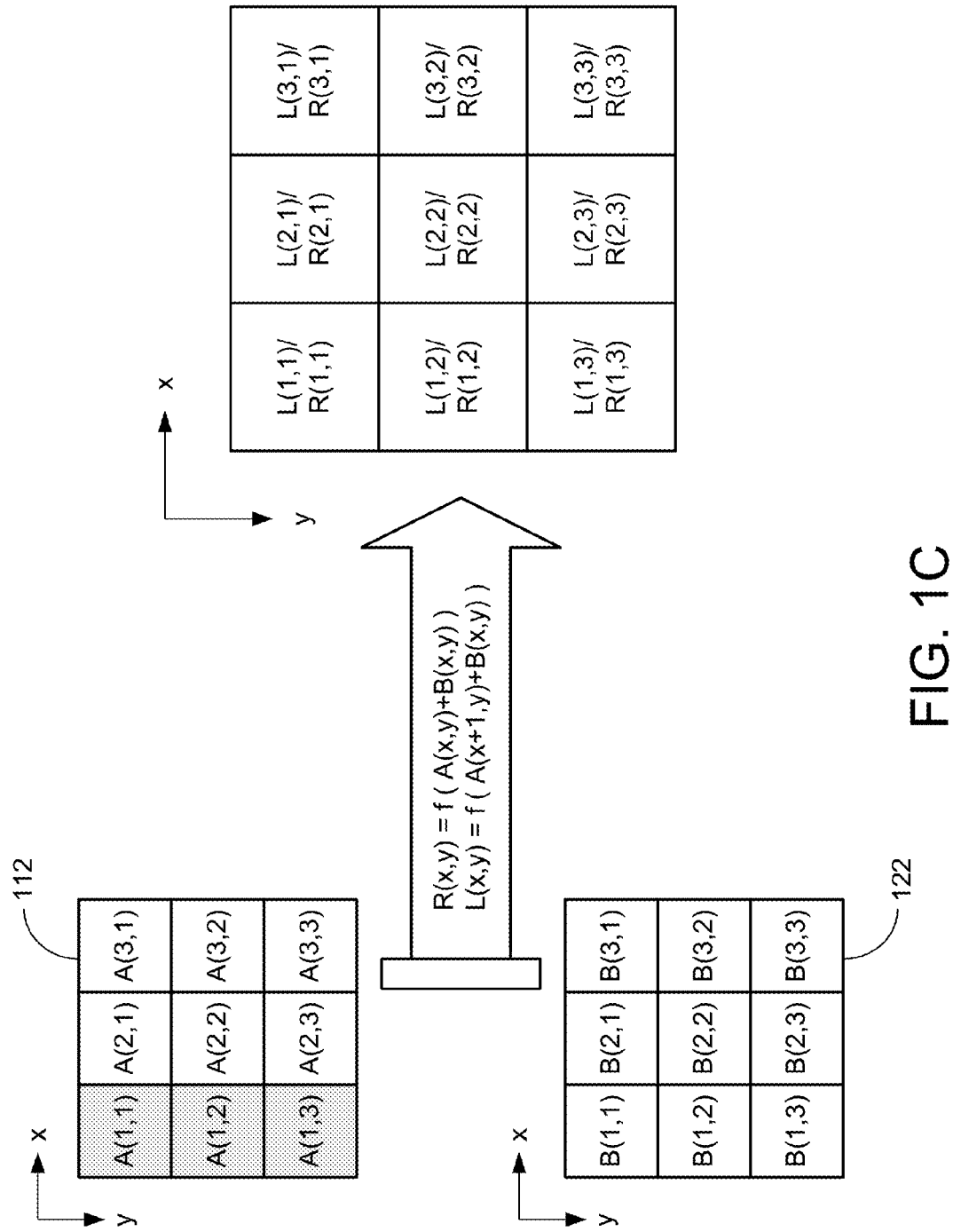
FIG. 1C shows schematically the first pixels and the second pixels, and the relationships of the left-eye and right-eye viewed gray levels of the image L(i, j) and R(i, j) and the first retardation A(i, j) of each first pixel and the second retardation B(i, j) of each second pixel, respectively, according to one embodiment of the present invention.

FIG. 1C shows schematically the first pixels, such as retardation pixels, and the second pixels, such as display pixels. The relationships of the left-eye and right-eye viewed gray levels of the image L(i, j) and R(i, j) and the first retardation A(i, j) of each first pixel and the second retardation B(i, j) of each second pixel, respectively, according to one embodiment of the present invention. As shown in FIG. 1C, the first LC layer 112 defines a plurality of first pixels arranged in a first pixel matrix (a retardation pixel matrix) having at least M pixel columns and N pixel rows, where M and N are positive integers. Similarly, the second LC layer 122 defines a plurality of second pixels arranged in a second pixel matrix (a display pixel matrix) having at least M pixel columns and N pixel rows. Each first pixel has a first retardation A(i, j), and each second pixel has a second retardation B(i, j), where i is a positive integer between 1 and M, and j is a positive integer between 1 and N. The M*N first and second pixel matrix relates to the resolution of the LCD. It should be appreciated that FIG. 1C schematically shows only a 3*3 matrix, which is a part of the pixel matrix, for each of the first and second pixels merely for illustration purpose, and the column number M and the row number N of the pixel matrix are generally larger numbers.

In some embodiments, the first LC layer 112 and the second LC layer 122 are LC layers utilize the same type of active matrix technology, which relates to the method of controlling the orientation of the LC molecules. Currently, existing LC active matrix technologies include, but not limited to, vertical alignment (VA), twisted nematic (TN), in-plane switching (IPS), fringe field switching (FFS), advanced fringe field switching (AFFS), and other active matrix technologies applicable for the LC layers. Details of the active matrix technologies are known to the person of ordinary skill in the art, and are hereinafter omitted.

As shown in FIGS. 1A-1C, light passes both the first pixel of the first panel 210 and the second pixel of the second panel 220 to generate the image signal corresponding to the pixel. Thus, the first panel 110 and the second panel 120 are arranged such that the first pixel matrix (the retardation pixel matrix) is positioned corresponding to the second pixel matrix (the display pixel matrix), and an image displayed in each first pixel of the first panel, or in each second pixel of the second panel is simultaneously viewable by left and right eyes of a viewer or a viewing apparatus in front of the first panel 110. As shown in FIG. 1C, the image satisfies the relationship of:

$$L(i,j)=f[A(i+1,j)+B(i,j)], \quad (1)$$

$$R(i,j)=f[A(i,j)+B(i,j)], \quad (2)$$

where the function f(x) is an optical transmittance function of each pixel of the LC layers, with x representing the retardations of each pixel of the LC layers.

The image displayed by the LCD device 100 utilizes all of the pixels to display the image simultaneously such that the image displayed by each of the pixels is simultaneously viewable by the viewer. Thus, resolution and frame rate of the LCD may be maintained. Further, the first panel 110 of the LCD device does not serve as a barrier layer, which blocks at least a part of the light, and the deficiency of reduced luminance in the conventional LCD is thus eliminated.

In some embodiments, the retardation of each pixel of a LC layer varies with orientation of the LC molecules of the pixel, and the orientation may be controlled by applying electrical fields to the pixels. Thus, for each first pixel of the first panel, the first retardation A(i, j) varies with orientation of LC molecules of the first pixel which is controlled by a first electrical field applied to the first pixel of the first panel. Similarly, for each second pixel of the second panel, the second retardation B(i, j) varies with orientation of LC molecules of the second pixel which is controlled by a second electrical field applied to the second pixel of the second panel. Accordingly, by controlling the first and second electrical field applied to each of the first and second pixels, respectively, the first retardation A(i, j) for each first pixel of the first panel 110 and the second retardation B(i, j) for each second pixel of the second panel 120 may be determined to obtain the desired left-eye and right-eye viewed gray levels L(i, j) and R(i, j) of the image.

Generally, the optical transmittance function of a LC layer relates to the active matrix type of the LC layer. For each type of active matrix of the LC layer, the optical transmittance function may be different. For example, for a single VA-type LC layer, the optical transmittance function T=f(x) is:

$$T = \frac{1}{2}\sin^2\frac{\Gamma}{2}, \quad (3)$$

$$\Gamma = \frac{2\pi}{\lambda}\int_z n_e(\theta) - n_o dz, \quad (4)$$

where $\Gamma$ is the retardation of the LC layer under the VA mode, $\theta$ is the orientation of the LC molecules of the LC layer (more specifically, the angle between the axis of the LC molecules and the wave vector of incident light), $\lambda$ is the wavelength of the light, and $n_e$ and $n_o$ are extraordinary and ordinary refractive indices of the VA-type LC molecules. Thus, the optical transmittance T is a function of the retardation $\Gamma$ of the LC layer, which in turn is a function of the orientation $\theta$ of the LC molecules.

FIG. 2A shows a chart of the retardation of a pixel of the LC layer according to one embodiment of the present invention. Specifically, the retardation of the pixel is shown in a transmittance-orientation relationship. The LC layer for FIG. 2A is the VA-type LC layer, and the optical transmittance function T are provided in formulas (3) and (4) as recited above. As shown in FIG. 2A, when the orientation of the LC molecules $\theta=\pi/2$, the LC layer has the maximum optical transmittance T, and when the orientation of the LC molecules $\theta=0$ or $\theta=\pi$, the LC layer has the minimum optical transmittance T.

It should be appreciated that, the optical transmittance function T=f(x) varies according to the type of the active matrix of the LC layers, and the chart of the retardation of the pixel would be different from the chart as shown in FIG. 2A. For example, the retardation of the pixel may be different in phase. In other words, the maximum and minimum optical transmittances T may occur with different orientations of the LC molecules θ.

Figure 2B:
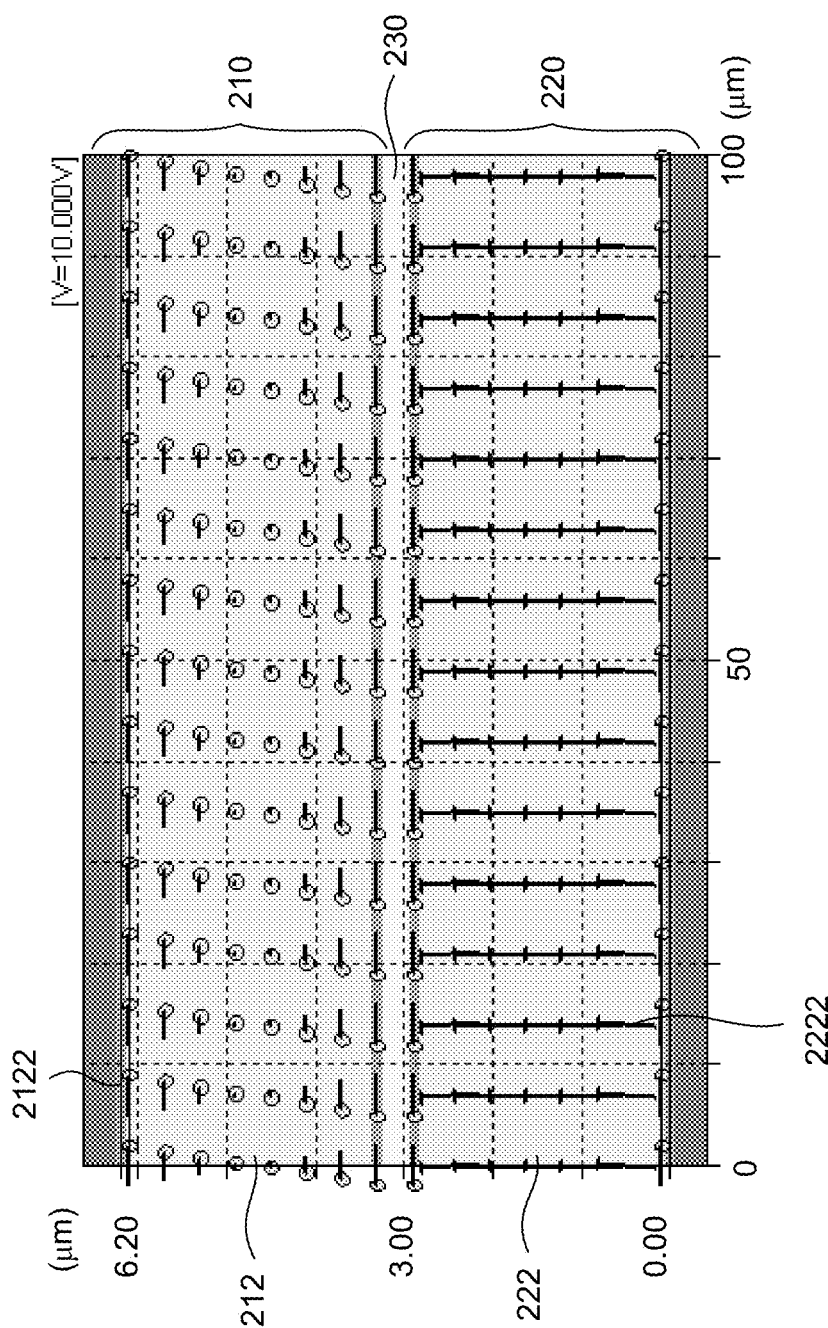
FIG. 2B shows schematically the LC layers of the LCD according to one embodiment of the present invention, where a white image is displayed.

FIG. 2B shows schematically the LC layers of the LCD according to one embodiment of the present invention, where a white image signal is displayed. As shown in FIG. 2B, the first LC layer 212 of the first panel 210 and the second LC layer 222 of the second panel 220 are TN-type LC layers. When no electrical field is applied to the TN-type LC layers, the LC molecules are in the 90° twisted orientation. As shown in FIG. 2B, no electrical field is applied to the first LC layer 212 such that the LC molecules 2122 remain the original 90° twisted orientation, and a second electrical field is applied to the second LC layer 222 such that all LC molecules 2222 aligns in the vertical direction. In this case, the optical transmittance of the first and second LC layers 212 and 222 would be a maximum, resulting in a white image signal.

Figure 2C:
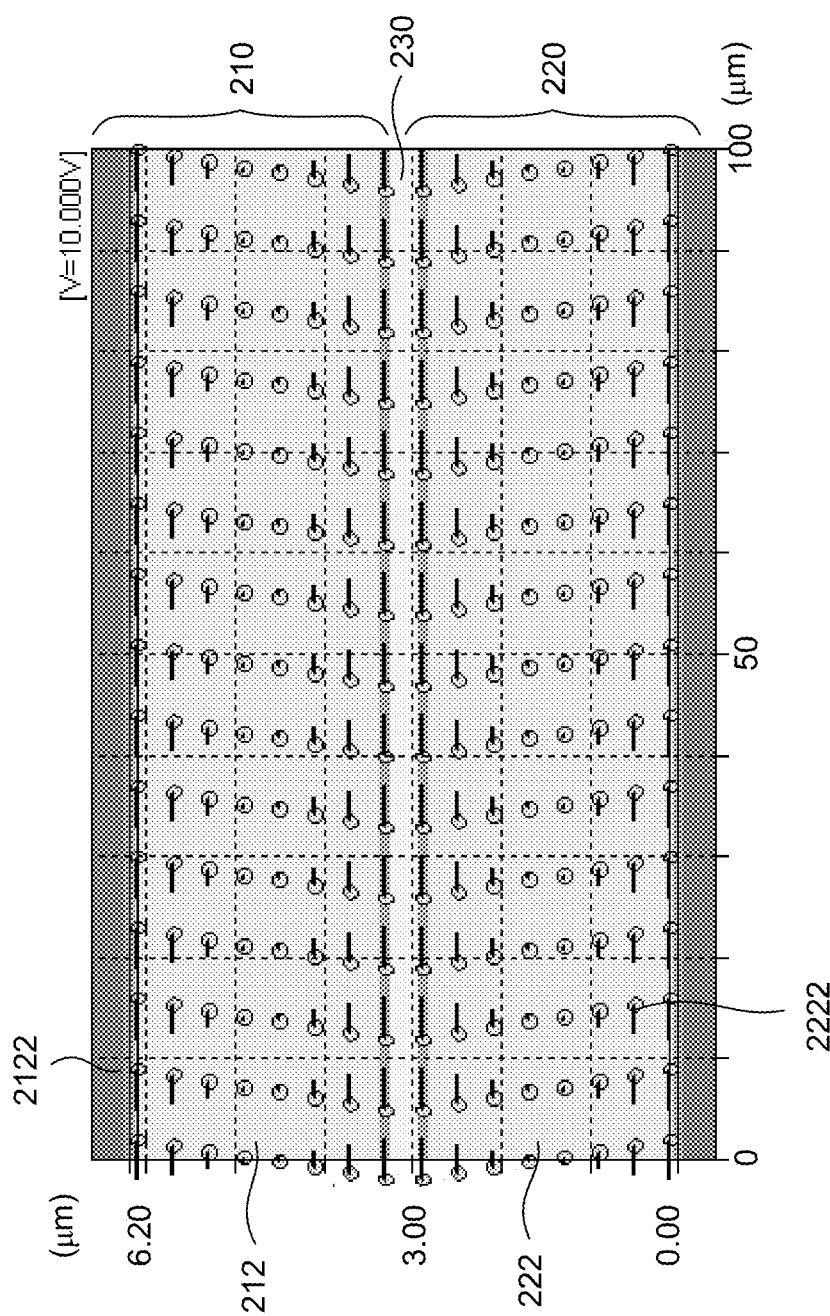
FIG. 2C shows schematically the LC layers of the LCD according to one embodiment of the present invention, where a black image is displayed.

On the other hand, FIG. 2C shows schematically the LC layers of the LCD according to one embodiment of the present invention, where a black image signal is displayed. The first LC layer 212 of the first panel 210 and the second LC layer 222 of the second panel 220 as shown in FIG. 2C are also TN-type LC layers, which are the same as the structure as shown in FIG. 2B. As shown in FIG. 2C, no electrical field is applied to either the first LC layer 212 or the second LC layer 222 such that the LC molecules 2122 of the first LC layer 212 and the LC molecules 2222 of the second LC layer 222 remain the original 90° twisted orientation. In this case, the optical transmittance of the first and second LC layers 212 and 222 would be a minimum, resulting in a black image signal.

Figure 2D:
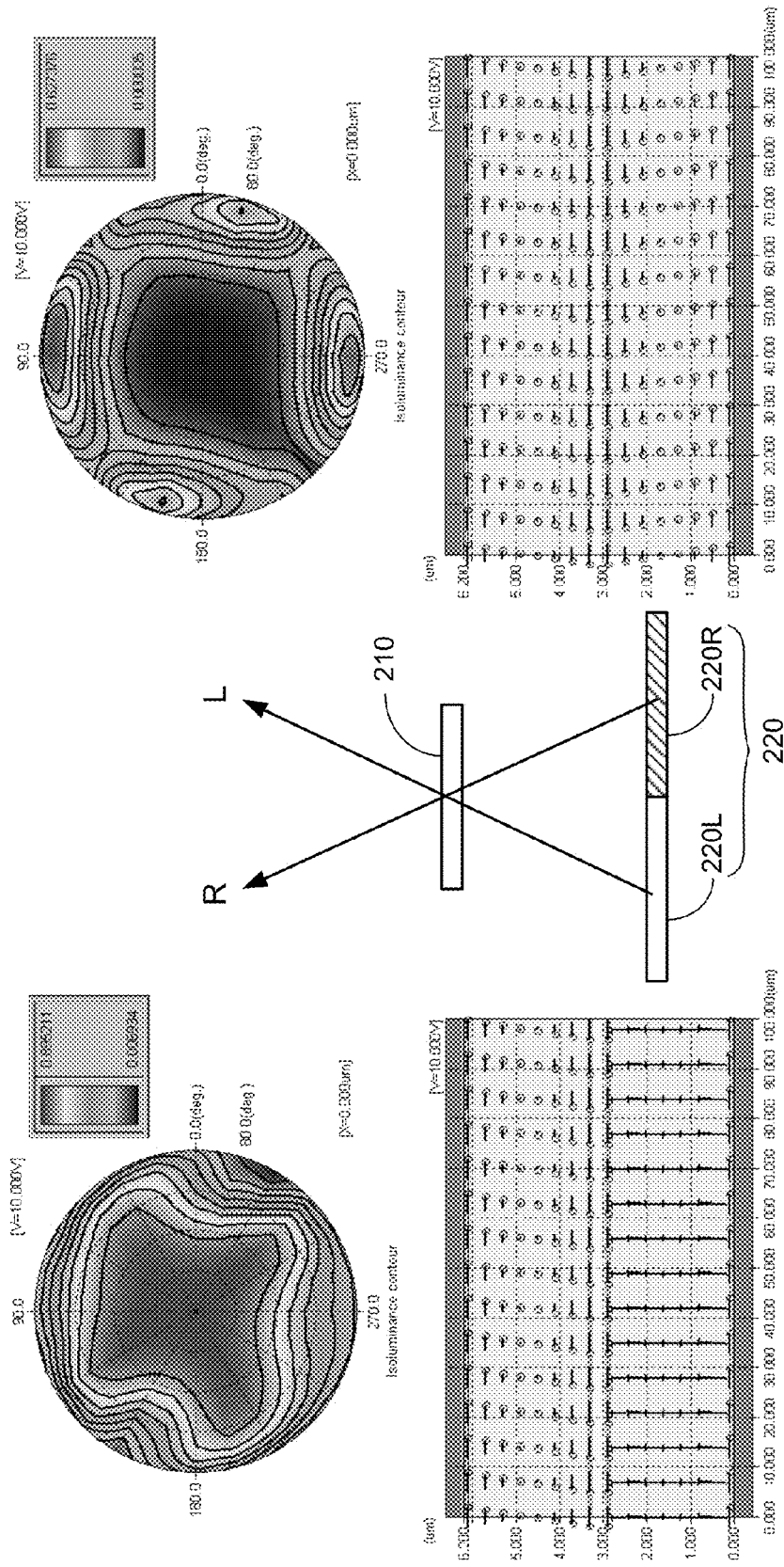
FIG. 2D shows simulation results of the LC layers of the LCD according to one embodiment of the present invention, where the left eye of the viewer sees a black image, and the right eye of the viewer sees a white image.

FIG. 2D shows simulation results of the LC layers of the LCD according to one embodiment of the present invention. As shown in FIG. 2D, the first panel 210 and the second panel 220 are the same TN-type panels as the ones as shown in FIGS. 2B and 2C, and one first pixel of the first panel 210 and two second pixels 220L and 220R of the second panel 220 are shown. The first pixel of the first panel 210 has the same structure as the first panel 210 as shown in FIGS. 2B and 2C, where no electrical field is applied to the first LC layer such that the LC molecules of the first LC layer remain the original 90° twisted orientation. The second pixel 220L of the second panel 220 has the same structure as the second panel 220 of FIG. 2C, where no electrical field is applied to the second LC layer such that the LC molecules of the second LC layer remain the original 90° twisted orientation. The second pixel 220R of the second panel 220 has the same structure as the second panel 220 of FIG. 2B, where a second electrical field is applied to the second LC layer such that all LC molecules aligns in the vertical direction. Thus, the left eye L of the viewer (on the right side of FIG. 2D) sees a black image, and the right eye R of the viewer (on the left side of FIG. 2D) sees a white image.

In operation, the LCD may be in the 2D display mode or in the 3D display mode. For displaying a 3D image in the 3D display mode, the viewer would see with both eyes different signals for each pixel of the image displayed. Thus, for each pixel, the left-eye and right-eye viewed gray levels L(i, j) and R(i, j) of the image are different. In other words, L(i, j)≠R(i, j). Thus, according to formulas (1) and (2) as recited above, A(i+1, j)≠A(i, j), which means for each first pixel (each retardation pixel), the first retardation A(i, j) would vary. In one embodiment, the LCD operates in the 3D display mode when the plurality of first pixels of the first panel is driven by the first electrical field, and the plurality of second pixels of the second panel is driven by the second electrical field.

Figure 3A:
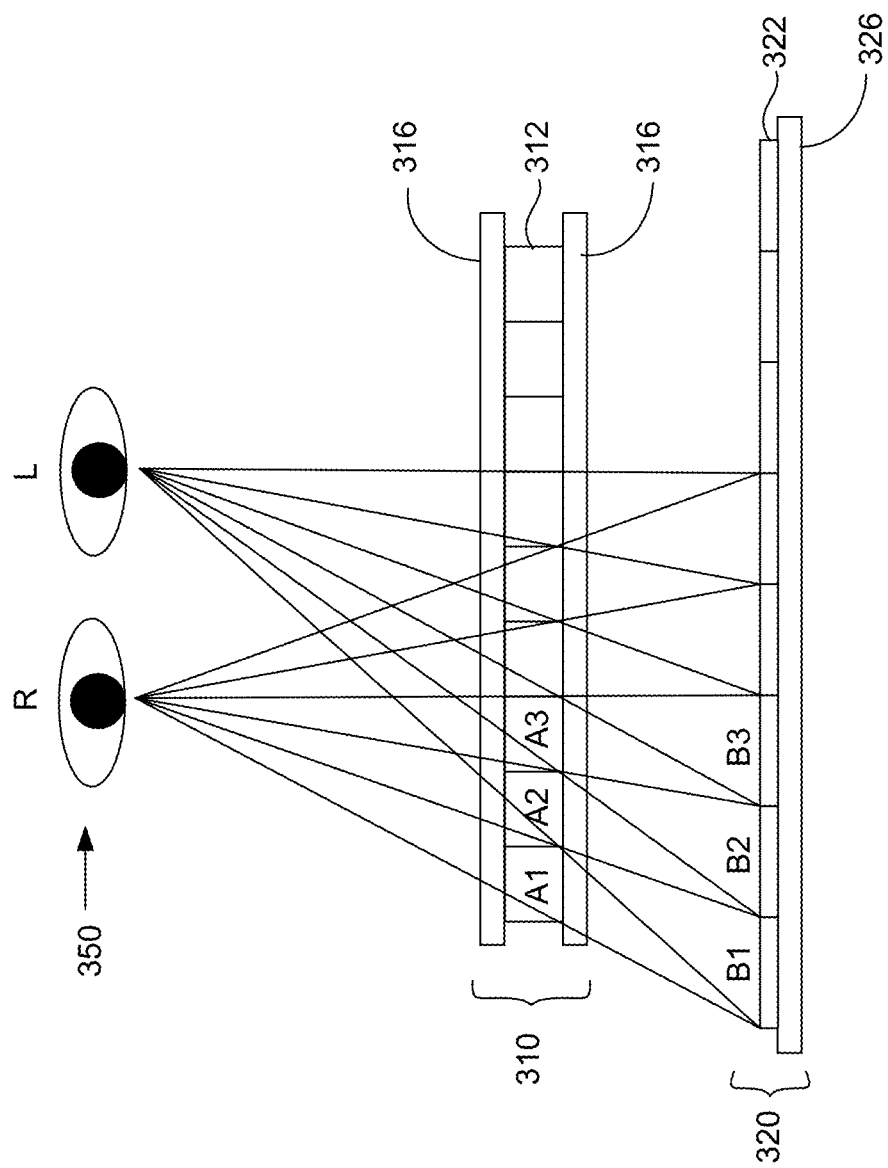
FIG. 3A shows schematically a top view of the LCD operating in the 3D display mode according to one embodiment of the present invention.

FIG. 3A shows schematically a top view of the LCD operating in the 3D display mode according to one embodiment of the present invention. For better illustration purposes, some of the layers of the first panel 310 and the second panel 320 are not shown, and only one row of the first pixel matrix of the first LC layer 312 and one row of the second pixel matrix of the second LC layer 322 are shown. In other words, FIG. 3A shows only one row of the pixels of the LCD. To simplify the description, the symbols A1, A2, A3, . . . are provided to represent the first retardation A(i, j) of the first pixels of the same row. In other words, A1=A(1, j), A2=A(2, j), etc. Similarly, the symbols B1, B2, B3, . . . are provided to represent the second retardation B(i, j) of the second pixels of the same row. The pixel pitch of the first pixels is designed corresponding to the pixel of the second pixels for 3D display, and it is well known by a person of ordinary skill in the art and not described in detail herein.

As shown in FIG. 3A, when a 3D image to be displayed is provided, the left-eye and right-eye viewed gray levels L(i, j) and R(i, j) of the image may be generated, where L(i, j)≠R(i, j). Thus, applying the left-eye and right-eye viewed gray levels L(i, j) and R(i, j) of the image to the formulas (1) and (2) would generate the following series of equations:

$$R1 = f[A1+B1], \quad (2\text{-}1)$$

$$L1 = f[A2+B1], \quad (1\text{-}1)$$

$$R2 = f[A2+B2], \quad (2\text{-}2)$$

$$L2 = f[A3+B2], \quad (1\text{-}2)$$

$$R3 = f[A3+B3], \quad (2\text{-}3)$$

where R1, R2, R3, . . . refer to the right-eye viewed gray levels R(i, j) of the same row, and L1, L2, L3 refer to the left-eye viewed gray levels L(i, j) of the same row.

Since the left-eye and right-eye viewed gray levels L1, L2, L3, . . . and R1, R2, R3, . . . of the 3D image are already generated from the 3D image, the first retardations A1, A2, A3, . . . and the second retardations B1, B2, B3, . . . may be calculated by the series of equations. Specifically, the first retardation A1 for one of the first pixels may be predetermined. Thus, the second retardation B1 for the corresponding second pixel may be calculated with equation (2-1) with the right-eye viewed gray level R1 and the predetermined first retardation A1. Then, the first retardation A2 for the next first pixel may be calculated with equation (1-1) with the left-eye viewed gray level L1 and the second retardation B1. In this way, once a first retardation A1 is determined, the first retardations A2, A3, . . . of the first pixels and the second retardations B1, B2, B3, . . . of the second pixels may be calculated. In other words, for each pixel row, a first retardation A(1, j) may be predetermined, and all of the first retardations A(2, j), A(3, j), . . . and the second retardations B(1, j), B(2, j), B(3, j), . . . may be calculated.

It should be appreciated that, in the above embodiment, the first retardation A1 for one of the first pixels is predetermined. However, a person of ordinary skill in the art may randomly choose one of the first pixels, or choose one of the second pixels, as the pixel with predetermined retardation. Thus, all of the first retardations A(i, j) and the second retardations B(i, j) may be calculated with the predetermined retardation.

When the first retardation A(i, j) for each first pixel of the first panel 310 and the second retardation B(i, j) for each second pixel of the second panel 320 are obtained, the 3D image may be displayed by the LCD with the first retardation A(i, j) for each first pixel of the first panel 310 and the second retardation B(i, j) for each second pixel of the second panel 320 such that the 3D image is simultaneously viewable by left and right eyes L and R of a viewer 350 in front of the first panel 310. By the above structure, the LCD can display the 3D image and 2D image in the same frame rate, such as 60 Hz and having the same resolution. Therefore, the frame rate for displaying the 3D images need not to be increased to 120 Hz, and no complicated driving circuit is required and the manufacture cost can decreased.

FIG. 3B shows schematically projection of the first and second pixels from the right eye of the viewer the LCD operating in the 3D display mode according to one embodiment of the present invention, and FIG. 3C shows schematically projection of the first and second pixels from the left eye of the viewer the LCD operating in the 3D display mode according to one embodiment of the present invention. As shown in FIG. 3B, a projection from the right eye R of the viewer passes through the first pixel of the first panel 310 with the first retardation A(4, 2) to the second pixel of the second panel 320 with the second retardation B(4, 2). Thus, according to formula (2), the image signal R(4, 2) received by the right eye R would be:

$$R(4,2)=f[A(4,2)+B(4,2)]. \quad (5)$$

Similarly, as shown in FIG. 3C, a projection from the left eye L of the viewer passes through the first pixel of the first panel 310 with the first retardation A(5, 2) to the second pixel of the second panel 320 with the second retardation B(4, 2). Thus, according to formula (1), the image signal L(4, 2) received by the right eye R would be:

$$L(4,2)=f[A(5,2)+B(4,2)]. \quad (6)$$

On the other hand, for displaying a 2D image in the 2D display mode, the viewer would see with both eyes the same signal for each pixel of the image displayed. Thus, for each pixel, the left-eye and right-eye viewed gray levels L(i, j) and R(i, j) of the image are the same. In other words, L(i, j)=R(i, j). Thus, according to formulas (1) and (2), A(i+1, j)=A(i, j), which means for the plurality of the first pixels, the first retardations A(i, j) are the same. In one embodiment, the LCD operates in the 2D display mode when the plurality of first pixels of the first panel is not driven by the first electrical field. In some embodiments, the LCD operates in the 2D display mode when all of the plurality of first pixels is driven by the same first electrical field such that each first pixel has the highest optical transmission rate.

Figure 3D:
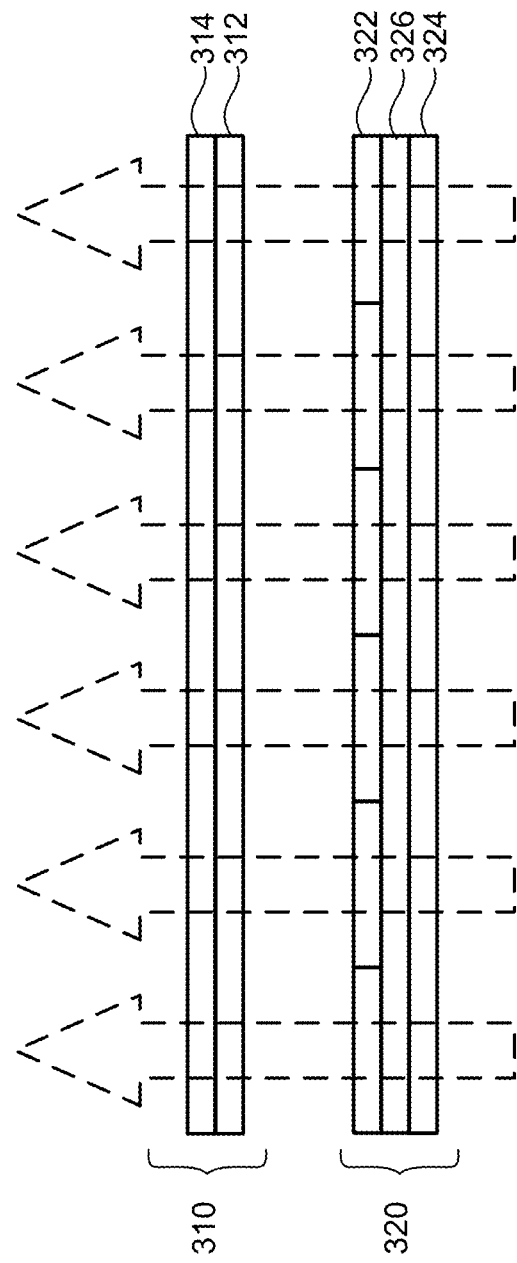
FIG. 3D shows schematically a top view of the LCD operating in the 2D display mode according to one embodiment of the present invention.

FIG. 3D shows schematically a top view of the LCD operating in the 2D display mode according to one embodiment of the present invention. For better illustration purposes, some of the layers of the first panel 310 and the second panel 320 are not shown, and only one row of the first pixel matrix of the first LC layer 312 and one row of the second pixel matrix of the second LC layer 322 are shown.

As shown in FIG. 3D, for the plurality of the first pixels of the first LC layer 312, the first retardation A(i, j) are the same. Thus, all of the plurality of first pixels of the first LC layer 312 of the first panel 310 may be not driven by any electrical field, or may be driven by the same first electrical field such that each first pixel has the highest optical transmission rate. Thus, the second panel 320 serves as the display panel of the LCD, and the second retardation B(i, j) for each second pixel of the second LC layer 322 may be calculated by the formulas (1) or (2) with the image signals of the 2D image and the first retardation A(i, j).

It should be appreciated that, when the LCD operates in the 3D display mode, the viewer must be in an optimum viewing zone to receive the image signals. However, the viewer may move around in front of the LCD. Thus, a wide viewing angle for the LCD may be achieved by providing compensation to the optical transmission function T=f(x).

Compensation may be performed in different ways. In one embodiment, the first panel serves as the major display panel. Thus, each first pixel of the first panel projects to at least one of the second pixels of the second panel, and each of the at least one second pixel of the second panel has at least one compensation ratio such that the image displayed in each first pixel of the first panel is compensated by the at least one second pixel with the at least one compensation ratio.

In one embodiment, the second panel serves as the major display panel. Thus, each second pixel of the second panel projects to at least one of the first pixels of the first panel, and each of the at least one first pixel of the first panel has at least one compensation ratio such that the image displayed in each second pixel of the second panel is compensated by the at least one first pixel with the at least one compensation ratio.

Figure 4B:
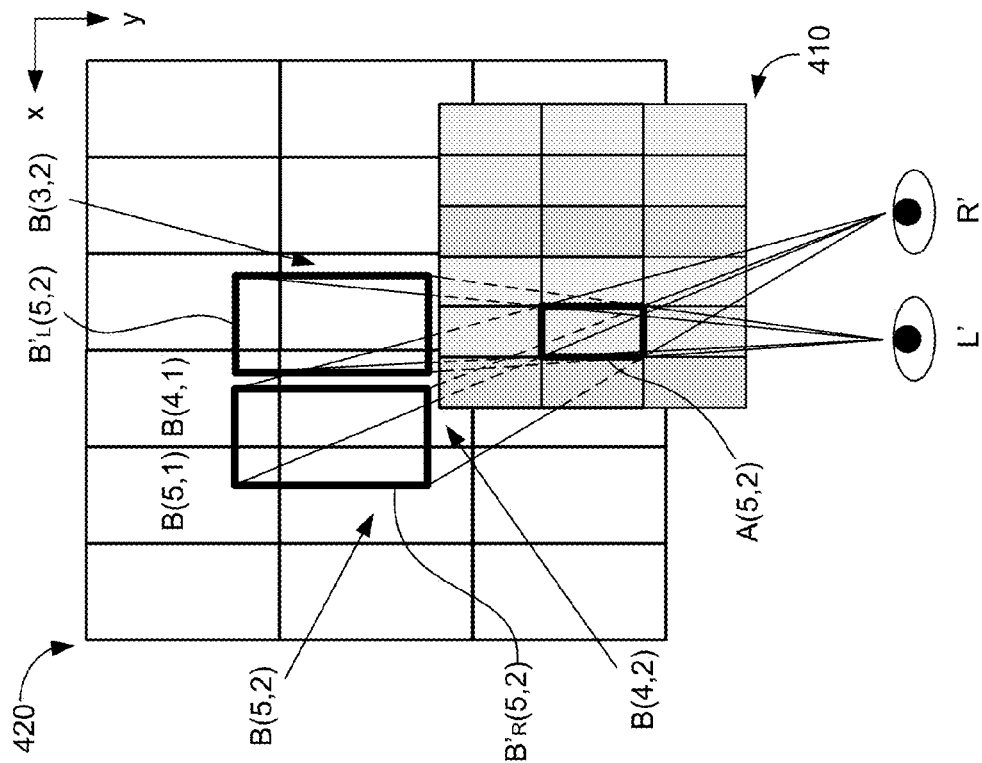
FIG. 4B shows schematically projection of the first and second pixels from the left and right eyes of the viewer the LCD operating in the 3D display mode according to one embodiment of the present invention.

FIGS. 4A-4D shows the compensation according to one embodiment of the present invention, where the first panel serves as the major display panel. Specifically, FIG. 4A shows schematically a top view of the LCD operating in the 3D display mode according to one embodiment of the present invention. In the exemplary 3D display mode, the first panel 410 and the second panel 420 are corresponding to the active retardation panel and the active retardation panel, respectively. For better illustration purposes, some of the layers of the first panel 410 and the second panel 420 are not shown, and only one row of the first pixel matrix (i.e., the retardation pixel matrix) of the first LC layer 412 and one row of the second pixel matrix (i.e., the display pixel matrix) of the second LC layer 422 are shown. In other words, FIG. 4A shows only one row of the pixels of the LCD. To simplify the description, the symbols A1, A2, A3, . . . are provided to represent the first retardation A(i, j) of the first pixels of the same row. In other words, A1=A(1, j), A2=A(2, j), etc. Similarly, the symbols B1, B2, B3, . . . are provided to represent the second retardation B(i, j) of the second pixels of the same TOW.

As shown in FIG. 4A, when the viewer moves in front of the first panel 410, the left and right eyes L and R of the viewer would move to the new positions L' and R'. Thus, projections from the new left-eye and right-eye positions L' and R' to the first pixels of the first LC panel 412 may fall between the second pixels of the second LC panel 422. For example, for the right-eye viewed gray level R2, the viewer in the optimum viewing zone would see by the right eye:

$$R2=f[A2+B2]. \quad (2\text{-}2)$$

However, the viewer in the new position would see by the right eye:

$$R2=a \times f[A2+B1]+b \times f[A2+B2], \quad (2\text{-}2a)$$

where a and b are compensation ratios.

Similarly, for the left-eye viewed gray level L2, the viewer in the optimum viewing zone would see by the left eye:

$$L2=f[A3+B2]. \quad (1\text{-}2)$$

However, the viewer in the new position would see by the left eye:

$$L2=a \times f[A3+B1]+b \times f[A3+B2]. \quad (1\text{-}2a)$$

Thus, the compensation ratios a and b (wherein 0≤a≤1, 0≤b≤1, and at least one of a and b is not equal to 0) may be determined such that the viewer may move around within a range of the optimum viewing zone to receive the same image signals R2 and L2 for the same pixel. In this way, the LCD provides a wide viewing zone such that the viewer may be freely movable within the range of the optimum viewing zone to see the same 3D images.

Figures 4C, 4D:
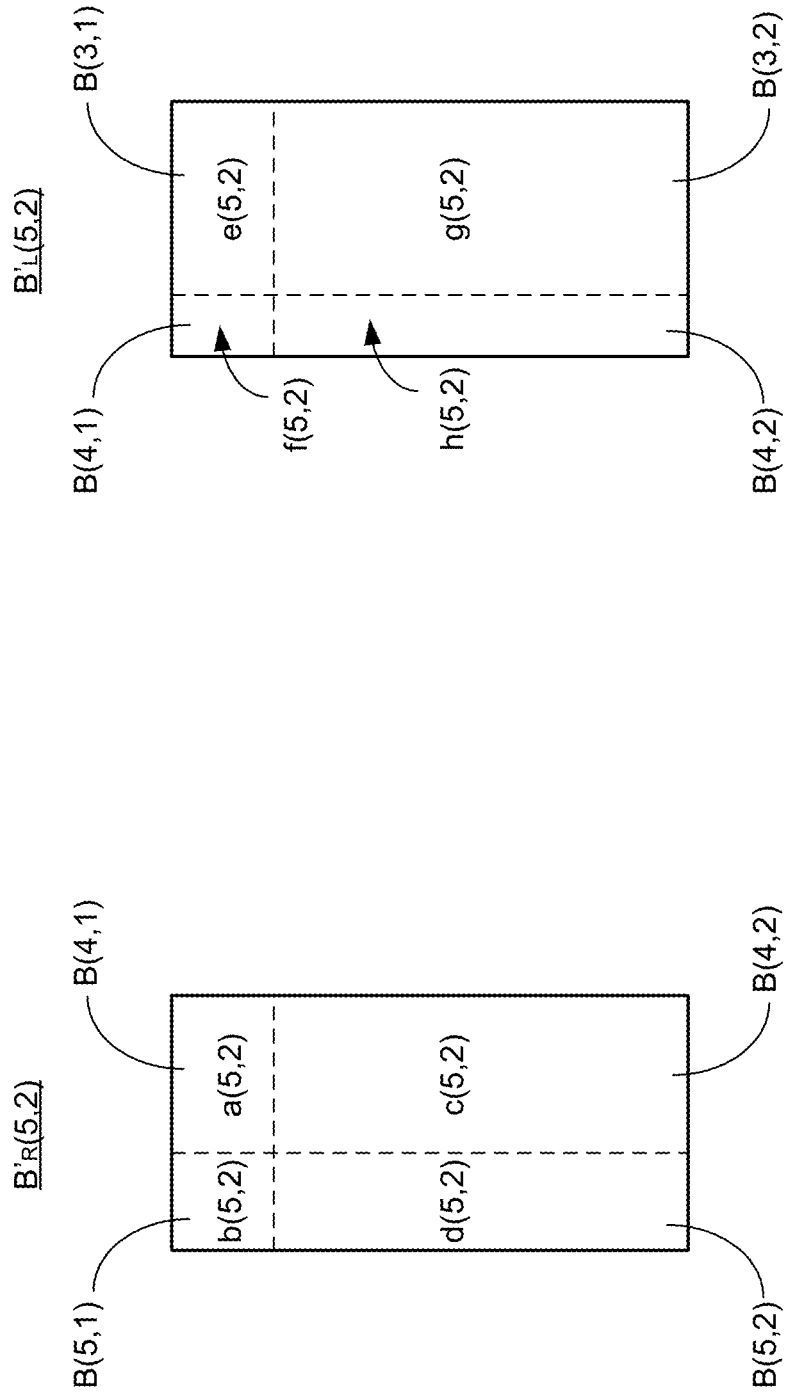
FIG. 4C shows schematically projection of the second pixels from the right eye of the viewer as shown in FIG. 4B according to one embodiment of the present invention.
FIG. 4D shows schematically projection of the second pixels from the left eye of the viewer as shown in FIG. 4B according to one embodiment of the present invention.

FIG. 4B shows schematically projection of the first and second pixels from the left and right eyes of the viewer the LCD operating in the 3D display mode according to one embodiment of the present invention, and FIGS. 4C and 4D show schematically projection of the second pixels from the left and right eyes, respectively, as shown in FIG. 4B according to one embodiment of the present invention. As shown in FIG. 4B, a projection from the right eye R' and the left eye L' of the viewer in the new position passes through the first pixel of the first panel 410 with the first retardation A(5, 2) to an area covering four second pixels of the second panel 420. As shown in FIG. 4C, the four second pixels include the ones with the second retardations B(4, 1), B(5, 1), B(4, 2) and B(5, 2) corresponding to the right eye R'. As shown in FIG. 4D, the four second pixels include the ones with the second retardations B(3, 1), B(4, 1), B(3, 2) and B(4, 2) corresponding to the left eye L'. Thus, a plurality of compensation ratios a(5, 2), b(5, 2), c(5, 2), d(5, 2), e(5, 2), f(5, 2), g(5, 2) and h(5, 2) may be determined such that the image signals R(5, 2) and L(5, 2) received by the right eye R' and the left eye L' in the new position would be:

$$R(5, 2) = \\ a(5, 2) \times f[A(5, 2) + B(4, 1)] + b(5, 2) \times f[A(5, 2) + B(5, 1)] + \\ c(5, 2) \times f[A(5, 2) + B(4, 2)] + d(5, 2) \times f[A(5, 2) + B(5, 2)]. \\ L(5, 2) = e(5, 2) \times f[A(5, 2) + B(3, 1)] + \\ f(5, 2) \times f[A(5, 2) + B(4, 1)] + \\ g(5, 2) \times f[A(5, 2) + B(3, 2)] + h(5, 2) \times f[A(5, 2) + B(4, 2)]$$ (7)

wherein 0≤a(5, 2)≤1, 0≤b(5, 2)≤1, 0≤c(5, 2)≤1, 0≤d(5, 2)≤1, and 0≤e(5, 2)≤1, 0≤f(5, 2)≤1, 0≤g(5, 2)≤1, and 0≤h(5, 2)≤1, and at least one of a(i, j), b(i, j), c(i, j) and d(i, j) is not equal to 0, and at least one of e(5, 2), f(5, 2), g(5, 2) and h(5, 2) is not equal to 0.

Thus, the compensation ratios a(5, 2), b(5, 2), c(5, 2), d(5, 2), e(5, 2), f(5, 2), g(5, 2) and h(5, 2) may be generated or determined such that the viewer may move around within a range of the optimum viewing zone to receive the same image signal R(5, 2) with the right eye and image signal L(5, 2) with the left eye.

It should be appreciated that the projection from each first pixel of the first panel 410 to the second panel 420 may be different. Thus, the projection from some of the first pixels to the second panel 420 may cover different numbers of the second pixels. In some embodiments, projection from each first pixel of the first panel 410 covers at least one of the second pixels on the second panel 420.

In some embodiments, for each of the at least one second pixel of the second panel, more than one of the compensation ratios may be provided to provide compensation of different viewer positions.

Figure 5A:
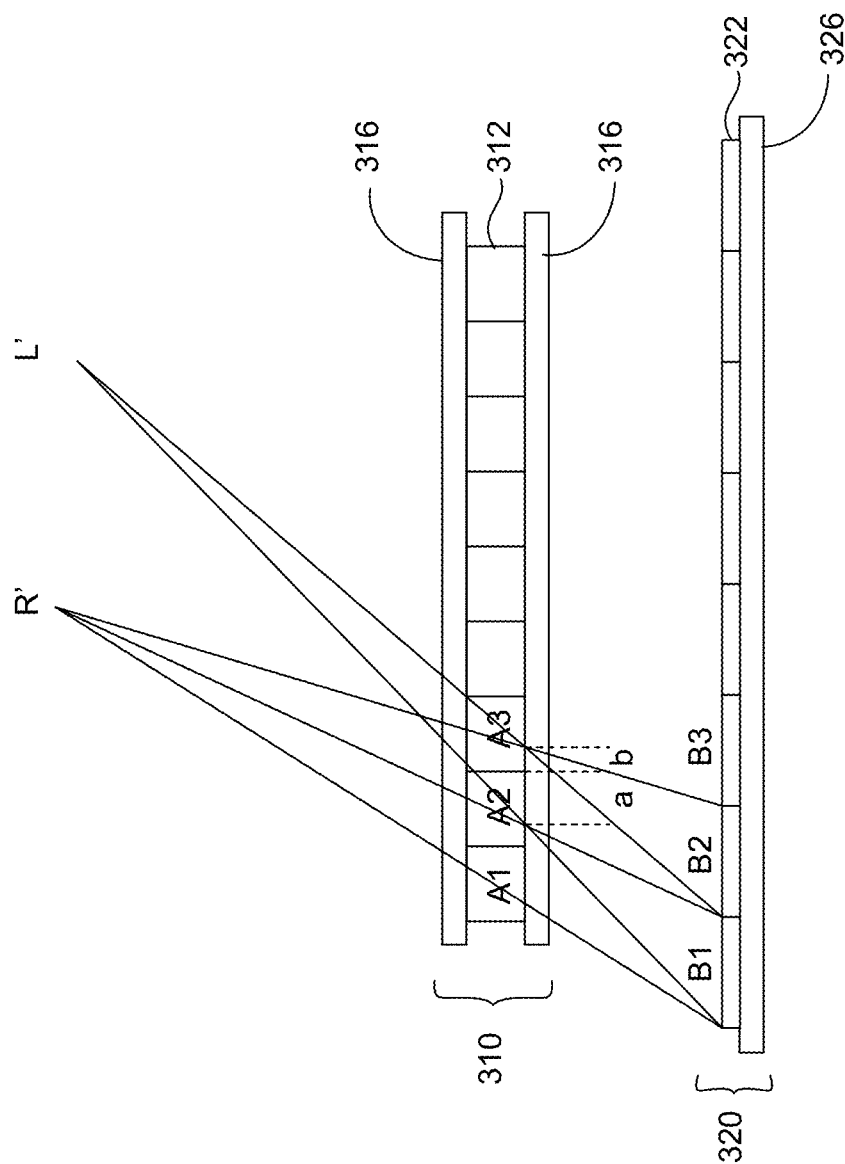
FIG. 5A shows schematically a top view of the LCD operating in the 3D display mode according to one embodiment of the present invention.

FIGS. 5A-5D shows the compensation according to another embodiment of the present invention, where the second panel serves as the major display panel. Specifically, FIG. 5A shows schematically a top view of the LCD operating in the 3D display mode according to one embodiment of the present invention. In the exemplary 3D display mode, the first panel 310 and the second panel 320 are corresponding to the active retardation panel and the active retardation panel, respectively. For better illustration purposes, some of the layers of the first panel 310 and the second panel 320 are not shown, and only one row of the first pixel matrix (i.e., the retardation pixel matrix) of the first LC layer 312 and one row of the second pixel matrix (i.e., the display pixel matrix) of the second LC layer 322 are shown. In other words, FIG. 5A shows only one row of the pixels of the LCD. To simplify the description, the symbols A1, A2, A3, . . . are provided to represent the first retardation A(i, j) of the first pixels of the same row. In other words, A1=A(1, j), A2=A(2, j), etc. Similarly, the symbols B1, B2, B3, . . . are provided to represent the second retardation B(i, j) of the second pixels of the same row.

As shown in FIG. 5A, when the viewer moves to the new positions L' and R', projections from the new left-eye and right-eye positions L' and R' to the second pixels of the second LC panel 422 may fall between the first pixels of the first LC panel 412. For example, for the right-eye viewed gray level R2, the viewer in the optimum viewing zone would see by the right eye:

$$R2=f[A2+B2].$$ (2-2)

However, the viewer in the new position would see by the right eye:

$$R2=a \times f[A2+B2]+b \times f[A3+B2],$$ (2-2b)

where a and b are compensation ratios.

Similarly, for the left-eye viewed gray level L1, the viewer in the optimum viewing zone would see by the left eye:

$$L1=f[A2+B1].$$ (1-1)

However, the viewer in the new position would see by the left eye:

$$L1=a \times f[A2+B1]+b \times f[A3+B1].$$ (1-1b)

Thus, the compensation ratios a and b (wherein 0≤a≤1, 0≤b≤1, and at least one of a and b is not equal to 0) may be determined such that the viewer may move around within a range of the optimum viewing zone to receive the same image signals R2 and L1 for the same pixel. In this way, the LCD provides a wide viewing zone such that the viewer may be freely movable within the range of the optimum viewing zone to see the same 3D images.

Figure 5C:
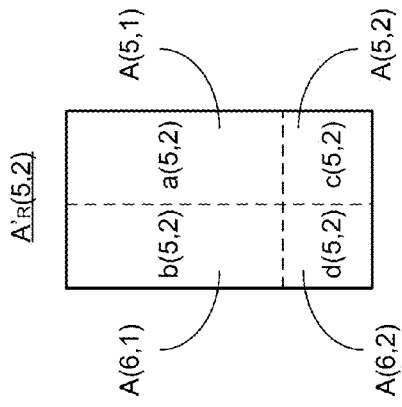
FIG. 5C shows schematically projection of the first pixels from the right eye of the viewer as shown in FIG. 5B according to one embodiment of the present invention.
Figure 5D:
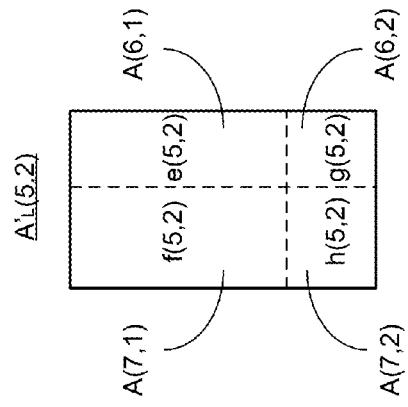
FIG. 5D shows schematically projection of the first pixels from the left eye of the viewer as shown in FIG. 5B according to one embodiment of the present invention.
Figure 5B:
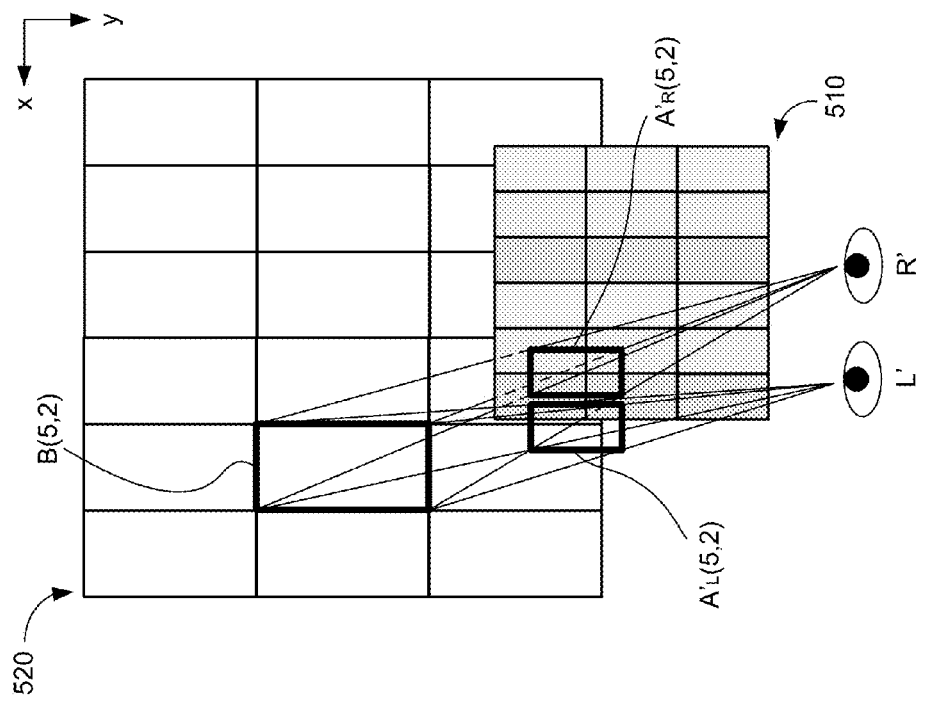
FIG. 5B shows schematically projection of the first and second pixels from the left and right eyes of the viewer the LCD operating in the 3D display mode according to one embodiment of the present invention.
Figure 6:
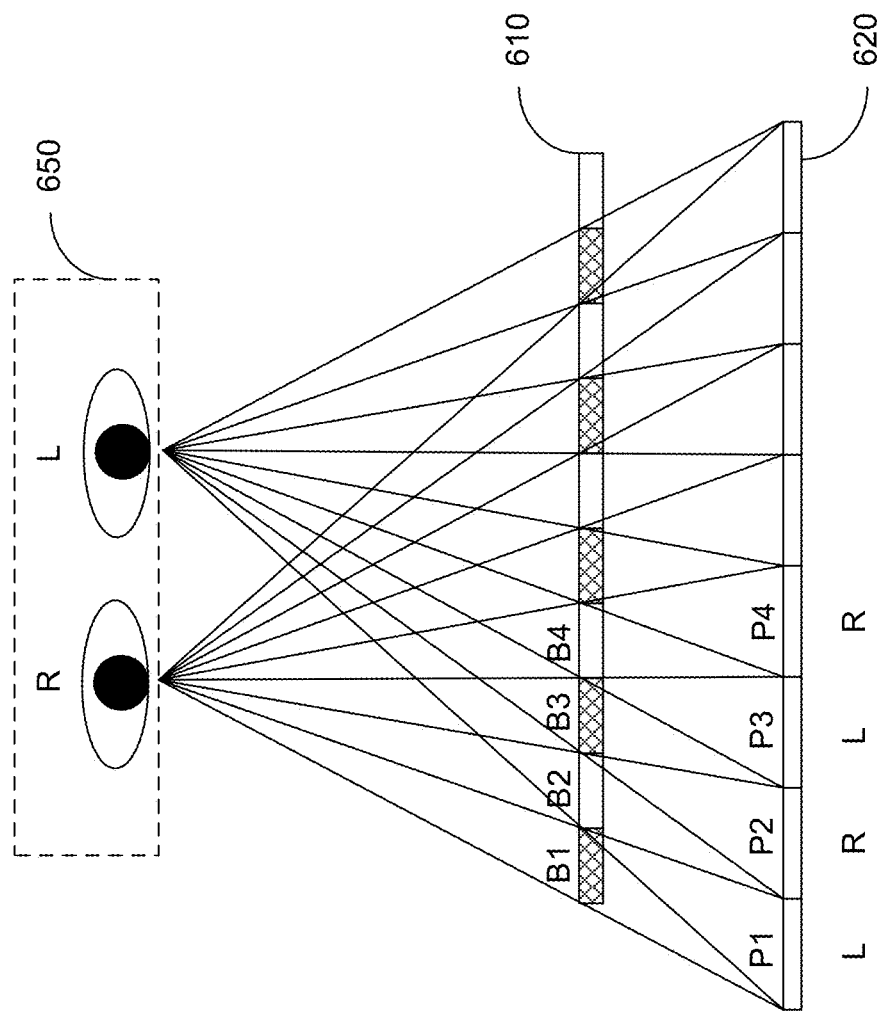
FIG. 6 shows schematically a conventional LCD according to related art.

FIG. 5B shows schematically projection of the first and second pixels from the left and right eyes of the viewer the LCD operating in the 3D display mode according to one embodiment of the present invention, and FIGS. 5C and 5D show schematically projection of the first pixels from the left and right eyes, respectively, as shown in FIG. 5B according to one embodiment of the present invention. As shown in FIG. 5B, a projection from the right eye R' and left eye L' of the viewer in the new position passes through the second pixel of the second panel 520 with the second retardation B(5, 2) to an area covering four first pixels of the first panel 510. As shown in FIG. 5C, the four first pixels include the ones with the first retardations A(5, 1), A(6, 1), A(5, 2) and A(6, 2) corresponding to the right eye R'. As shown in FIG. 5D, the four first pixels include the ones with the first retardations A(6, 1), A(7, 1), A(6, 2) and A(7, 2) corresponding to the left eye L'. Thus, a plurality of compensation ratios a(5, 2), b(5, 2), c(5, 2), d(5, 2), e(5, 2), f(5, 2), g(5, 2) and h(5, 2) may be determined such that the image signals R(5, 2) and L(5, 2) received by the right eye R' and the left eye L' in the new position would be:

$$R(5, 2) = \qquad (8)$$
$$a(5,2) \times f[A(5,1)+B(5,2)] + b(5,2) \times f[A(6,1)+B(5,2)] +$$
$$c(5,2) \times f[A(5,2)+B(5,2)] + d(5,2) \times f[A(6,2)+B(5,2)]$$
$$L(5,2) = e(5,2) \times f[A(6,1)+B(5,2)] +$$
$$f(5,2) \times f[A(7,1)+B(5,2)] +$$
$$g(5,2) \times f[A(6,2)+B(5,2)] + h(5,2) \times f[A(7,2)+B(5,2)].$$

wherein 0≤a≤1, 0≤b≤1, 0≤c≤1, 0≤d≤1, and 0≤e≤1, 0≤f≤1, 0≤g≤1, and 0≤h≤1, and at least one of a(i, j), b(i, j), c(i, j) and d(i, j) is not equal to 0, and at least one of e(5, 2), f(5, 2), g(5, 2) and h(5, 2) is not equal to 0.

Thus, the compensation ratios a(5, 2), b(5, 2), c(5, 2), d(5, 2), e(5, 2), f(5, 2), g(5, 2) and h(5, 2) may be generated or determined such that the viewer may move around within a range of the optimum viewing zone to receive the same image signal R(5, 2) with the right eye and image signal L(5, 2) with the left eye.

It should be appreciated that the projection from each second pixel of the second panel 520 to the first panel 510 may be different. Thus, the projection from some of the second pixels to the first panel 510 may cover different numbers of the first pixels. In some embodiments, projection from each second pixel of the second panel 520 covers at least one of the first pixels on the first panel 510.

In some embodiments, for each of the at least one first pixel of the first panel, more than one of the compensation ratios may be provided to provide compensation of different viewer positions.

In sum, the invention, among other things, recites LCDs operably switchable between a 2D display mode and a 3D display mode and methods of displaying images with the same. By the above structure, the LCD can display the 3D image and 2D image in the same frame rate, such as 60 Hz and having the same resolution. Therefore, the frame rate for displaying the 3D images need not to be increased to 120 Hz, and no complicated driving circuit is required and the manufacture cost can decreased.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A liquid crystal display (LCD) device operably switchable between a two-dimensional (2D) display mode and a three-dimensional (3D) display mode for a viewer having a left eye and a right eye, comprising:
a first polarizer and a second polarizer spaced apart to each other;
an active retardation panel disposed between the first polarizer and the second polarizer, the active retardation panel having a plurality of retardation pixels arranged in a retardation pixel matrix having at least M pixel columns and at least N pixel rows, each of the retardation pixel having a first retardation A(i, j), wherein M and N are positive integers, i is a positive integer between 1 and M, and j is a positive integer between 1 and N; and
a liquid crystal display panel disposed between the active retardation panel and the second polarizer, the liquid crystal display panel having a plurality of display pixels arranged in a display pixel matrix having at least M pixel columns and at least N pixel rows, each of the display pixel having a second retardation B(i, j), the retardation pixel matrix being positioned corresponding to the display pixel matrix,
wherein an image displayed from each of the display pixels of the liquid crystal display panel and passed through the active retardation panel is simultaneously viewed by the left eye and the right eye of the viewer and satisfies the relationship of:

$$L(i,j)=f[A(i+1,j)+B(i,j)], \text{ and}$$

$$R(i,j)=f[A(i,j)+B(i,j)],$$

wherein L(i, j) and R(i, j) are respectively left-eye and right-eye viewed gray levels of the image; and
wherein each retardation pixel of the active retardation panel projects to at least one of the display pixels of the liquid crystal display panel, and each of the at least one display pixel of the liquid crystal display panel has at least one compensation ratio such that the image displayed in each retardation pixel of the active retardation panel is compensated by the at least one display pixel with the at least one compensation ratio.

2. The liquid crystal display device of claim 1, wherein no polarizer is disposed between the liquid crystal display panel and the active retardation panel.

3. The liquid crystal display device of claim 1, further comprising a color filter disposed in one of the liquid crystal display panel and the active retardation panel.

4. The liquid crystal display device of claim 1, wherein the liquid crystal display panel and the active retardation panel are spatially separated by a gap.

5. The liquid crystal display device of claim 4, wherein the gap is filled with a transparent material.

6. The liquid crystal display device of claim 1, wherein the liquid crystal display panel and the active retardation panel are integratedly formed.

7. The liquid crystal display device of claim 1, wherein the active retardation panel comprises a first liquid crystal layer, and the liquid crystal display panel comprises a second liquid crystal layer.

8. The liquid crystal display device of claim 7, wherein for each retardation pixel of the active retardation panel, the first retardation A(i, j) varies with orientation of LC molecules in the first liquid crystal layer of the retardation pixel which is controlled by a first electrical field applied to the retardation pixel of the active retardation panel, and wherein for each display pixel of the liquid crystal display panel, the second retardation B(i, j) varies with orientation of LC molecules in the second liquid crystal layer of the display pixel which is controlled by a second electrical field applied to the display pixel of the liquid crystal display panel.

9. The liquid crystal display device of claim 8, operating in the 2D display mode when L(i, j)=R(i, j), wherein for the plurality of the retardation pixels, the first retardations A(i, j) are the same.

10. The liquid crystal display device of claim 9, operating in the 2D display mode when the plurality of retardation pixels of the active retardation panel is driven by the same first electrical field such that for the plurality of the retardation pixels, the first retardations A(i, j) are the same.

11. The liquid crystal display device of claim 9, operating in the 2D display mode when the plurality of retardation pixels of the active retardation panel is not driven by the first electrical field.

12. The liquid crystal display device of claim 8, operating in the 3D display mode when L(i,j)≠R(i,j).

13. The liquid crystal display device of claim 12, operating in the 3D display mode when the plurality of retardation pixels of the active retardation panel is driven by the first electrical field, and the plurality of display pixels of the liquid crystal display panel is driven by the second electrical field.

14. The liquid crystal display device of claim 1, further comprising a backlight adjacent to the liquid crystal display panel and the second polarizer for irradiating a light to the liquid crystal display panel.

15. The liquid crystal display device of claim 1, wherein the at least one compensation ratio comprises compensation ratios a and b, such that $$L(i,j)=a \times f[A(i+1,j)+B(i-1,j)]+b \times f[A(i+1,j)+B(i,j)], \text{ and}$$

$$R(i,j)=a \times f[A(i,j)+B(i-1,j)]+b \times f[A(i,j)+B(i,j)],$$

wherein $0 \leq a \leq 1$, $0 \leq b \leq 1$, and at least one of a and b is not equal to 0.

16. The liquid crystal display device of claim 1, wherein the at least one compensation ratio comprises compensation ratios a(i,j), b(i,j), c(i,j), d(i,j), e(i,j), f(i,j), g(i,j), h(i,j), such that $$R(i, j) = a(i, j) \times f[A(i, j) + B(i-1, j-1)] + b(i, j) \times f[A(i, j) + B(i, j-1)] + c(i, j) \times f[A(i, j) + B(i-1, j)] + d(i, j) \times f[A(i, j) + B(i, j)],$$

and $$L(i, j) = e(i, j) \times f[A(i, j) + B(i-2, j-1)] + f(i, j) \times f[A(i, j) + B(i-1, j-1)] + g(i, j) \times f[A(i, j) + B(i-2, j)] + h(i, j) \times f[A(i, j) + B(i-1, j)],$$

wherein $0 \leq a(i,j) \leq 1$, $0 \leq b(i,j) \leq 1$, $0 \leq c(i,j) \leq 1$, $0 \leq d(i,j) \leq 1$, at least one of a(i, j), b(i, j), c(i, j) and d(i, j) is not equal to 0, and $0 \leq e(i,j) \leq 1$, $0 \leq f(i,j) \leq 1$, $0 \leq g(i,j) \leq 1$, $0 \leq h(i,j) \leq 1$, at least one of e(i, j), f(i, j), g(i, j) and h(i, j) is not equal to 0.

17. A liquid crystal display (LCD) device operably switchable between a two-dimensional (2D) display mode and a three-dimensional (3D) display mode for a viewer having a left eye and a right eye, comprising: a first polarizer and a second polarizer spaced apart to each other; an active retardation panel disposed between the first polarizer and the second polarizer, the active retardation panel having a plurality of retardation pixels arranged in a retardation pixel matrix having at least M pixel columns and at least N pixel rows, each of the retardation pixel having a first retardation A(i, j), wherein M and N are positive integers, i is a positive integer between 1 and M, and j is a positive integer between 1 and N; and a liquid crystal display panel disposed between the active retardation panel and the second polarizer, the liquid crystal display panel having a plurality of display pixels arranged in a display pixel matrix having at least M pixel columns and at least N pixel rows, each of the display pixel having a second retardation B(i, j), the retardation pixel matrix being positioned corresponding to the display pixel matrix, wherein an image displayed from each of the display pixels of the liquid crystal display panel and passed through the active retardation panel is simultaneously viewed by the left eye and the right eye of the viewer and satisfies the relationship of: L(i,j)=f[A(i+1,j)+B(i,j)], and R(i,j)=f[A(i,j)+B(i,j)], wherein L(i, j) and R(i, j) are respectively left-eye and right-eye viewed gray levels of the image; and wherein each display pixel of the liquid crystal display panel projects to at least one of the retardation pixel of the active retardation panel, and each of the at least one retardation pixel of the active retardation panel has at least one compensation ration such that the image displayed in each display pixel of the liquid crystal display panel is compensated by the at least one retardation pixel with the at least one compensation ratio.

18. The liquid crystal display device of claim 17, wherein the at least one compensation ratio comprises compensation ratios a(i,j), b(i,j), c(i,j), d(i,j), e(i,j), f(i,j), g(i,j), h(i,j), such that $$R(i, j) = a(i, j) \times f[A(i, j-1) + B(i, j)] + b(i, j) \times f[A(i+1, j-1) + B(i, j)] + c(i, j) \times f[A(i, j) + B(i, j)] + d(i, j) \times f[A(i+1, j) + B(i, j)],$$

and $$L(i, j) = e(i, j) \times f[A(i+1, j-1) + B(i, j)] + f(i, j) \times f[A(i+2, j-1) + B(i, j)] + g(i, j) \times f[A(i+1, j) + B(i, j)] + h(i, j) \times f[A(i+2, j) + B(i, j)],$$

wherein $0 \leq a(i,j) \leq 1$, $0 \leq b(i,j) \leq 1$, $0 \leq c(i,j) \leq 1$, $0 \leq d(i,j) \leq 1$, at least one of a(i, j), b(i, j), c(i, j) and d(i, j) is not equal to 0, and $0 \leq e(i,j) \leq 1$, $0 \leq f(i,j) \leq 1$, $0 \leq g(i,j) \leq 1$, $0 \leq h(i,j) \leq 1$, at least one of e(i, j), f(i, j), g(i, j) and h(i, j) is not equal to 0.

19. The liquid crystal display device of claim 17, wherein the first panel comprises an active retardation panel and the second panel comprises a liquid crystal display panel.

20. The liquid crystal display device of claim 17, operating in the 3D display mode when L(i, j)≠R(i, j).

21. A method of displaying an image, comprising:
(a) providing a liquid crystal display (LCD) device comprising:
an active retardation panel having a first liquid crystal (LC) layer defining a plurality of retardation pixels arranged in a retardation pixel matrix having M pixel columns and N pixel rows, wherein each retardation pixel has a first retardation A(i, j), wherein M and N are positive integers, i is a positive integer between 1 and M, and j is a positive integer between 1 and N; and
a liquid crystal display panel positioned behind the active retardation panel, having a second LC layer defining a plurality of display pixels arranged in a display pixel matrix having M pixel columns and N pixel rows, wherein each display pixel has a second retardation B(i, j),
wherein the active retardation panel and the liquid crystal display panel are arranged such that the retardation pixel matrix is positioned corresponding to the display pixel matrix;

(b) generating left-eye and right-eye viewed gray levels L(i, j) and R(i, j), respectively, for the image to be displayed;

(c) calculating, for each retardation pixel of the active retardation panel and for each display pixel of the liquid crystal display panel, the first retardation A(i, j) and the second retardation B(i, j) by:

$$L(i,j)=f[A(i+1,j)+B(i,j)], \text{ and}$$

$$R(i,j)=f[A(i,j)+B(i,j)]; \text{ and}$$

(d) displaying the image with the first retardation A(i, j) for each retardation pixel of the active retardation panel and the second retardation B(i, j) for each display pixel of the liquid crystal display panel such that the image displayed in each retardation pixel of the active retardation panel, or in each display pixel of the liquid crystal display panel, is simultaneously viewable by left and right eyes of a viewer in front of the active retardation panel, wherein when the image to be displayed is a three-dimensional (3D) image, the displaying of the image by the liquid crystal display device comprises:

(i) projecting each retardation pixel of the active retardation panel to at least one of the display pixels of the liquid crystal display panel; and (ii) generating, for each of the at least one display pixel of the liquid crystal display panel, at least one compensation ratio such that the image displayed in each retardation pixel of the active retardation panel is compensated by the at least one display pixel with the at least one compensation ratio.

22. The method of claim 21, wherein when the image to be displayed is a two-dimensional (2D) image, L(i, j)=R(i, j), and for the plurality of the retardation pixels, the first retardations A(i, j) are the same.

23. The method of claim 22, wherein when the image to be displayed is the 2D image, the displaying of the image by the liquid crystal display device comprises:

(a) controlling, for each display pixel of the liquid crystal display panel, orientation of LC molecules of the display pixel to have the second retardation B(i, j) by applying a second electrical field to the display pixel.

24. The method of claim 22, wherein when the image to be displayed is the 2D image, the displaying of the image by the liquid crystal display device comprises:

(a) controlling, for each retardation pixels of the active retardation panel, orientation of LC molecules of the retardation pixel such that the plurality of the retardation pixels has the same first retardation A(i, j) by applying the same first electrical field to each retardation pixel; and (b) controlling, for each display pixel of the liquid crystal display panel, orientation of LC molecules of the display pixel to have the second retardation B(i, j) by applying a second electrical field to the display pixel.

25. The method of claim 21, wherein when the image to be displayed is a three-dimensional (3D) image, L(i, j)≠R(i, j).

26. The method of claim 23, wherein when the image to be displayed is the 3D image, the displaying of the image by the liquid crystal display device further comprises:

(a) controlling, for each retardation pixel of the active retardation panel, orientation of LC molecules of the retardation pixel to have the first retardation A(i, j) by applying a first electrical field to the retardation pixel; and (b) controlling, for each display pixel of the active retardation panel, orientation of LC molecules of the display pixel to have the second retardation B(i, j) by applying a second electrical field to the display pixel.

27. A method of displaying an image, comprising:

(a) providing a liquid crystal display (LCD) device comprising:

an active retardation panel having a first liquid crystal (LC) layer defining a plurality of retardation pixels arranged in a retardation pixel matrix having M pixel columns and N pixel rows, wherein each retardation pixel has a first retardation A(i, j), wherein M and N are positive integers, i is a positive integer between 1 and M, and j is a positive integer between 1 and N; and a liquid crystal display panel positioned behind the active retardation panel, having a second LC layer defining a plurality of display pixels arranged in a display pixel matrix having M pixel columns and N pixel rows, wherein each display pixel has a second retardation B(i, j), wherein the active retardation panel and the liquid crystal display panel are arranged such that the retardation pixel matrix is positioned corresponding to the display pixel matrix;

(b) generating left-eye and right-eye viewed gray levels L(i, j) and R(i, j), respectively, for the image to be displayed;

(c) calculating, for each retardation pixel of the active retardation panel and for each display pixel of the liquid crystal display panel, the first retardation A(i, j) and the second retardation B(i, j) by:

$$L(i,j)=f[A(i+1,j)+B(i,j)] \text{ and}$$

$$R(i,j)=f[A(i,j)+B(i,j)]; \text{ and}$$

(d) displaying the image with the first retardation A(i, j) for each retardation pixel of the active retardation panel and the second retardation B(i, j) for each display pixel of the liquid crystal display panel such that the image displayed in each retardation pixel of the active retardation panel, or in each display pixel of the liquid crystal display panel, is simultaneously viewable by left and right eyes of a viewer in front of the active retardation panel, wherein when the image to be displayed is a three-dimensional (3D) image, the displaying the image by the liquid crystal display device comprises:

(i) projecting each display pixel of the liquid crystal display panel to at least one of the retardation pixels of the active retardation panel;

(ii) generating, for each of the at least one retardation pixel of the active retardation panel, at least one compensation ratio such that the image displayed in each display pixel of the liquid crystal display panel is compensated by the at least one retardation pixel with the at least one compensation ratio.

28. The method of claim 27, wherein when the image to be displayed is a three-dimensional (3D) image, L(i, j)≠R(i, j).

29. The method of claim 28, wherein when the image to be displayed is the 3D image, the displaying of the image by the liquid crystal display device further comprises:

(a) controlling, for each retardation pixel of the active retardation panel, orientation of LC molecules of the retardation pixel to have the first retardation A(i, j) by applying a first electrical field to the retardation pixel; and (b) controlling, for each display pixel of the active retardation panel, orientation of LC molecules of the display pixel to have the second retardation $B(i, j)$ by applying a second electrical field to the display pixel.

* * * * *